US008340350B2

(12) United States Patent
Kondo et al.

(10) Patent No.: US 8,340,350 B2
(45) Date of Patent: Dec. 25, 2012

(54) INFORMATION PROCESSING DEVICE AND METHOD, AND PROGRAM

(75) Inventors: Tetsujiro Kondo, Tokyo (JP); Kenji Takahashi, Kanagawa (JP); Tomoyuki Otsuki, Kanagawa (JP); Kunio Kawaguchi, Kanagawa (JP); Koichi Fujishima, Saitama (JP)

(73) Assignee: Sony Corporation, Tokyo (JP)

( * ) Notice: Subject to any disclaimer, the term of this patent is extended or adjusted under 35 U.S.C. 154(b) by 965 days.

(21) Appl. No.: 12/398,688

(22) Filed: Mar. 5, 2009

(65) Prior Publication Data

US 2009/0226039 A1 Sep. 10, 2009

(30) Foreign Application Priority Data

Mar. 10, 2008 (JP) ................................ P2008-059044

(51) Int. Cl.
*G06K 9/00* (2006.01)
(52) U.S. Cl. ...... 382/103; 382/300; 348/538; 348/402.1
(58) Field of Classification Search .................. 382/103, 382/300; 348/538, 402.1
See application file for complete search history.

(56) References Cited

U.S. PATENT DOCUMENTS

| 5,353,119 | A | * | 10/1994 | Dorricott et al. | ............... | 348/446 |
|---|---|---|---|---|---|---|
| 5,517,248 | A | * | 5/1996 | Isoda | ............................. | 348/459 |
| 6,442,203 | B1 | * | 8/2002 | Demos | ...................... | 375/240.16 |
| 6,625,333 | B1 | * | 9/2003 | Wang et al. | .................... | 382/300 |
| 2002/0130969 | A1 | * | 9/2002 | Han et al. | ........................ | 348/452 |
| 2004/0046891 | A1 | * | 3/2004 | Mishima et al. | .............. | 348/459 |
| 2006/0029253 | A1 | * | 2/2006 | Pace | ............................... | 382/103 |
| 2010/0020232 | A1 | * | 1/2010 | Mori et al. | ..................... | 348/452 |

FOREIGN PATENT DOCUMENTS

| JP | 2001-204023 | 7/2001 |
|---|---|---|
| JP | 2005-303983 | 10/2005 |
| JP | 2007-129400 | 5/2007 |
| JP | 2007129400 | * 5/2007 |

* cited by examiner

*Primary Examiner* — Jayesh A Patel
(74) *Attorney, Agent, or Firm* — Oblon, Spivak, McClelland, Maier & Neustadt, L.L.P.

(57) ABSTRACT

An information processing device for tracking the image of a tracking point within a moving image wherein contents, of multiple images which are continuous temporally, are discontinuous temporally, includes: a block-matching unit for performing block matching within the moving image, wherein a processed image and an image prior to the processed image are compared to determine the position of the tracking point within the processed image; an interpolation unit for performing interpolation processing wherein the position of the tracking point within an image not subjected to the block matching, which is an image before or after the processed image within the moving image, is determined as the position of the tracking point within the processed image; and a motion-vector calculating unit for obtaining the motion vector of the tracking point based on the position of the tracking point within the processed image determined by the block-matching unit or interpolation unit.

14 Claims, 13 Drawing Sheets

INFORMATION PROCESSING DEVICE AND METHOD, AND PROGRAM

CROSS REFERENCES TO RELATED APPLICATIONS

The present invention contains subject matter related to Japanese Patent Application JP 2008-059044 filed in the Japanese Patent Office on Mar. 10, 2008, the entire contents of which are incorporated herein by reference.

BACKGROUND OF THE INVENTION

1. Field of the Invention

The present invention relates to an information processing device and method, and program, and specifically, relates to an information processing device and method, and program whereby a tracking target within a moving image can be tracked accurately.

2. Description of the Related Art

Heretofore, an arrangement has been conceived wherein the content of an image is analyzed, and the analyzed results thereof are employed for image processing or the like. For example, an arrangement has been conceived wherein, with a moving image such as a shot image by a video camera, a desired portion within each of frame images is determined as a tracking point, and an image is enlarged, or the operation of the video camera is controlled so as to track the tracking point (e.g., see Japanese Unexamined Patent Application Publication No. 2005-303983).

Various methods have been proposed as a technique for tracking a target included in a moving image which is specified by a user. For example, there is a method for tracking by block matching processing. Block matching has been known as a method for obtaining a motion vector by employing the current field (or frame) image and an image adjacent thereto by one field (or one frame) to obtain a difference value (evaluation value) of these blocks. Further, in order to realize tracking, a motion vector calculated for each field (or frame) is integrated with the position specified first by the user as a starting point.

FIG. 1 schematically illustrates a situation in case where a moving image according to the interlace method is subjected to such tracking processing. As shown in FIG. 1, a frame 11 which is a frame image within this moving image is configured of two field images of a first field 11-1 and second field 11-2. Similarly, a frame 12 following the frame 11 is configured of a first field 12-1 and second filed 12-2, and a frame 13 following the frame 12 is configured of a first field 13-1 and second field 13-2.

The block matching of tracking processing with such a moving image is generally performed between adjacent fields in the same frame (e.g., between the first field 11-1 and first field 12-1) instead of between consecutive fields (e.g., between the first field 11-1 and second field 11-2). Further, for the sake of reduction in processing cost, or the like, just one of the fields of each frame is subjected to block matching, and the other field is interpolated by employing the values of fields which are adjacent to each other forward and backward (e.g., the average value between previous and following fields is applied). That is to say, either the first field or the second field is set as a field to be subjected to block matching beforehand, and with regard to the field thereof, block matching is performed between the same fields between consecutive frames, and a motion vector is calculated by employing the result thereof, but with regard to the other field, the average value of motion vectors obtained with temporally previous and following adjacent fields, or the like is interpolated.

For example, when assuming that the position of the tracking point at the first field of a certain frame is P(t−1), and motion calculated by block matching is V, a position P'(t−1) at the second field of the frame thereof, and a position P(t) at the first field of the next frame are as in the following Expressions (1) and (2).

$$P(t) = P(t-1) + V \quad (1)$$

$$P'(t-1) = P(t-1) + V/2 \quad (2)$$
$$= \{P(t-1) + P(t)\}/2$$

Note that, in general, as with a case of a moving image according to the progressive method, block matching is frequently performed by skipping one frame.

Incidentally, as with the case of a movie for example, to convert a moving image according to the progressive method of 24 frames per second (hereafter, referred to as "24p image") into a moving image according to the interlace method of 60 fields per second, employed for, for example, television broadcasting or the like, is to divide a single frame image into two field images or three field images, lending to the general reference "2-3 pulldown".

FIG. 2 illustrates an example of a situation of 2-3 pulldown. As shown in FIG. 2, a frame 21 which is a frame image at certain point-in-time within a 24p image is divided into two field images which are 60i images, with a first field 31-1 of a frame 31 as the first field, and a second field 31-2 as the second field. Also, a frame 22 following the frame 21 is similarly divided into three field images which are 60i images, with a first field 32-1 of a frame 32 following the frame 31, and a first field 33-1 of a frame 33 following the frame 32 as the first fields, and a second field 32-2 of the frame 32 as the second field.

Further, a frame 23 following the frame 22 is similarly divided into two field images which are 60i images, with a first field 34-1 of a frame 34 following the frame 33 as the first field, and a second field 33-2 of the frame 33 as the second field. Also, a frame 24 following the frame 23 is similarly divided into three field images which are 60i images, with a first field 35-1 of a frame 35 following the frame 34 as the first field, and a second field 34-2 of the frame 34, and a second field 35-2 of the frame 35 as the second field.

As described above, each frame image within a 24p image is converted into two fields or three fields of a 60i image.

Similarly, to convert a moving image according to the progressive method of 30 frames per second (hereafter, referred to as "30p image") into 60i images is to divide a frame image into two field images, which is generally referred to as "2-2 pulldown".

FIG. 3 is a diagram illustrating an example of a situation of 2-2 pulldown. As shown in FIG. 3, a frame 41 which is a frame image at certain point-in-time within a 30p image is divided into two fields which are 60i images, i.e., a first field 51-1 and second field 51-2 of a frame 51. Similarly, a frame 42, frame 43, and frame 44 following the frame 41 within the 30p image are divided into fields which are 60i images, i.e., a first field image 52-1 and second field image 52-2 of a frame 52, a first field image 53-1 and second field image 53-2 of a frame 53, and a first field image 54-1 and second field image 54-2 of a frame 54, respectively.

There are various types of conversion processing as such conversion processing, and for example, there is conversion processing for converting into a moving image according to the progressive method of 60 frames per second (hereafter, referred to as "60p image") in parallel with 2-3 or 2-2 pulldown without being divided into fields.

In either conversion case, the respective field images (or frame images) of the generated moving image are field images wherein frame images, which are continuous temporally in an original moving image, are (divided into fields, and are) rearranged, which are discontinuous temporally.

For example, with the example in FIG. 1, the first field 11-1 and second field 11-2 images are images at mutually different point-in-time, but the first field 31-1 and second field 31-2 in FIG. 2 have been generated from the same frame image 21, so are images at mutually the same point-in-time. Thus, with a moving image generated by pulldown, consecutive fields images (or frame images) are not necessarily continuous temporally.

SUMMARY OF THE INVENTION

However, in a case where block matching is performed regarding such temporal discontinuous images, there is a concern wherein a tracking result by interpolation processing might be shift from an original tracking target.

FIG. 4 is a diagram for describing a case where tracking processing is performed with an image generated by 2-3 pulldown. FIG. 4 is divided into a top stage and bottom stage by a dotted line around the middle, and order proceeding from the left side to right side of the top stage, and order proceeding from the left side to right side of the bottom stage represent time series. Frames 61 through 65 shown in the upper side of each of the top stage and bottom stage illustrate frame images (e.g., 24p images) which are continuous temporally before 2-3 pulldown. For example, the frame 61 is a frame image at point-in-time t, and similarly, the frame 62 is a frame image at point-in-time (t+1), and the frame 65 is a frame image at point-in-time (t+4).

Fields 71-1 through 76-1 shown on the lower side of each of the top stage and bottom stage illustrate field images which are continuous temporally after 2-3 pulldown (e.g., 60i image). Arrows illustrate relative relations between a frame and fields. For example, the field 71-1 which is a first field of a frame 71 within the 60i image, and the field 71-2 which is a second field of the frame 71 are fields converted and generated from the frame 61 which is a 24p image.

Similarly, the field 72-1 which is a first field of a frame 72 within the 60i image, the field 72-2 which is a second field of the frame 72, and the field 73-1 which is a first field of a frame 73, are fields converted and generated from the frame 62 which is a 24p image. Also, the field 73-2 which is a second field of the frame 73 within the 60i image, and the field 74-1 which is a first field of a frame 74 are fields converted and generated from the frame 63 which is a 24p image. Further, the field 74-2 which is a second field of the frame 74 within the 60i image, the field 75-1 which is a first field of a frame 75, and the field 75-2 which is a second field of a frame 75 are fields converted and generated from the frame 64 which is a 24p image. The field 76-1 which is a first field of a frame 76 within the 60i image is a field converted and generated from the frame 65 which is a 24p image.

Tracking targets 81 which are star-shaped images shown in the respective frames and fields are images to be tracked by tracking processing. P(t) illustrates the position of a tracking target (at point-in-time t) within the frame 61, P(t+1) illustrates the position of a tracking target (at point-in-time t+1) within the frame 62, P(t+2) illustrates the position of a tracking target (at point-in-time t+2) within the frame 63, P(t+3) illustrates the position of a tracking target (at point-in-time t+3) within the frame 64, and P(t+4) illustrates the position of a tracking target (at point-in-time t+4) within the frame 65.

Also, tracking points 82 shown in filled circles in the fields 71-1 through 76-1 represent processing results (tracking destinations at that time) of tracking processing. Now, let us say that tracking is performed regarding the first fields of each frame by employing block matching, and tracking is performed regarding the second fields by employing the average value of the tracking points of the first fields to perform interpolation.

With such an example in FIG. 4, with regard to the fields 71-1, 72-1, 73-1, 74-1, 75-1, and 76-1 which are the first fields of the respective frames, a tracking destination is obtained by block matching, so the positions of the tracking targets 81 and tracking points 82 are basically matched.

On the other hand, the tracking points 82 of the second fields are obtained by interpolation processing. Accordingly, for example, with the field 71-2, while the position of the tracking target 81 is the P(t) in the same way as the field 71-1, the position of the tracking point 82 becomes an average value between the position P(t) of the tracking point 82 in the field 71-1, and the position P(t+1) of the tracking point 82 in the field 72-1, i.e., {P(t)+P(t+1)}/2. Accordingly, as shown in FIG. 4, with the field 71-2, the position of the tracking point 82 is deviated from the tracking target 81. According to the same principle, with the fields 73-2, 74-2, and 75-2, a deviation is caused between the positions of the tracking point 82 and tracking target 82.

As described above, with an moving image made up of images wherein consecutive fields or frames are discontinuous temporally, there has been a concern that the precision of tracking processing might deteriorate. For example, as shown in FIG. 5, with each field in FIG. 4, in a case where a partial image with the obtained tracking point 82 as the center is enlarged for display, there has been a concern that with the enlarged image thereof with the tracking point 82 as a center point, the position of the tracking target 81 might be changed for each field, and accordingly, might not be determined in a stable manner.

An enlarged image 91-1 shown in FIG. 5 is an image wherein a region of a predetermined range with the tracking point 82 as the center has been extracted from the field 71-1 in FIG. 4, and enlarged. Similarly, an enlarged image 91-2 is an image wherein a region of a predetermined range with the tracking point 82 as the center has been extracted from the field 71-2 in FIG. 4, and enlarged. Enlarged images 92-1 through 96-1 are similarly images extracted from the fields 72-1 through 76-1 and enlarged, respectively. That is to say, in FIG. 5, the enlarged images 91-1, 91-2, 92-1, 92-2, 93-1, 93-2, 94-1, 94-2, 95-1, 95-2, and 96-1 are field images which are continuous in this order.

When viewing a moving image made up of such respective images in real time, the position of the tracking target 81 is appears to be finely vibrating due to such as the above-mentioned deviation between the tracking target 81 and tracking point 82, which might present an uncomfortable image for the user.

There has been realized demand to enable a tracking target to be tracked accurately even in a case of a moving image wherein the contents of field images or frame images which are continuous temporally are discontinuous temporally.

According to an embodiment of the present invention, an information processing device configured to track the image of a tracking point which is a tracking target within a moving image wherein contents, of multiple images which are continuous temporally, are discontinuous temporally, includes: a block matching unit configured to perform block matching regarding some images of the moving image, wherein an image to be processed and an image which is temporally prior to the image to be processed are compared to determine the position of the tracking point within the image to be processed; an interpolation unit configured to perform interpolation processing wherein the position of the tracking point within an image which is not subjected to the block matching by the block matching unit, which is an image before or after the image to be processed within the moving image, having content at the same point-in-time as that of the image to be processed, is determined as the position of the tracking point within the image to be processed; and a motion vector calculating unit configured to obtain the motion vector of the tracking point from an image which is temporally prior to the image to be processed to the image to be processed based on the position of the tracking point within the image to be processed determined by the block matching unit or the interpolation unit.

The moving image may be a moving image subjected to 2-3 pulldown conversion for dividing a frame image into two or three field images.

The moving image may be a moving image subjected to 2-2 pulldown conversion for dividing a frame image into two field images.

The motion vector calculating unit may include: a first motion vector calculating unit configured to obtain the motion vector of the tracking point from an image which is temporally prior to the image to be processed to the image to be processed based on the position of the tracking point within the image to be processed determined by the interpolation unit; and a second motion vector calculating unit, based on the position of the tracking point within the image to be processed determined by the block matching unit, and the position of the tracking point within an image which is prior to the image to be processed determined by the interpolation unit, configured to obtain the motion vector of the tracking point from the previous image to the image to be processed.

According to an embodiment of the present invention, an information processing method for an information processing device configured to track the image of a tracking point which is a tracking target within a moving image wherein contents, of multiple images which are continuous temporally, are discontinuous temporally, includes the steps of: performing block matching regarding some images of the moving image, wherein an image to be processed and an image which is temporally prior to the image to be processed are compared to determine the position of the tracking point within the image to be processed; performing interpolation processing wherein the position of the tracking point within an image which is not subjected to the block matching, which is an image before or after the image to be processed within the moving image, having content at the same point-in-time as that of the image to be processed, is determined as the position of the tracking point within the image to be processed; and obtaining the motion vector of the tracking point from an image which is temporally prior to the image to be processed to the image to be processed based on the position of the tracking point within determined the image to be processed.

According to an embodiment of the present invention, a program, arranged to track the image of a tracking point which is a tracking target within a moving image wherein contents, of multiple images which are continuous temporally, are discontinuous temporally, causes a computer to execute the steps of: performing block matching regarding some images of the moving image, wherein an image to be processed and an image which is temporally prior to the image to be processed are compared to determine the position of the tracking point within the image to be processed; performing interpolation processing wherein the position of the tracking point within an image which is not subjected to the block matching by the block matching processing, which is an image before or after the image to be processed within the moving image, having content at the same point-in-time as that of the image to be processed, is determined as the position of the tracking point within the image to be processed; and obtaining the motion vector of the tracking point from an image which is temporally prior to the image to be processed to the image to be processed based on the position of the tracking point within the image to be processed determined by the block matching processing or the interpolation processing.

According to the above configurations, block matching is performed regarding some images of the moving image, wherein an image to be processed and an image which is temporally prior to the image to be processed are compared to determine the position of the tracking point within the image to be processed, the position of the tracking point within an image which is not subjected to the block matching, which is an image before or after the image to be processed within the moving image, having content at the same point-in-time as that of the image to be processed, is determined as the position of the tracking point within the image to be processed, and based on the position of the tracking point within the determined image to be processed, the motion vector of the tracking point from an image which is temporally prior to the image to be processed to the image to be processed is obtained.

According to an embodiment of the present invention, an information processing device configured to track the image of a tracking point which is a tracking target within a moving image, includes: a block matching unit configured to perform block matching regarding some images of the moving image, wherein an image to be processed and an image which is temporally prior to the image to be processed are compared to determine the position of the tracking point within the image to be processed; a discontinuity detecting unit configured to detect temporal discontinuity regarding the contents of multiple images which are continuous temporally in the moving image; an interpolation unit configured to perform interpolation processing wherein, in a case where temporal discontinuity has been detected by the discontinuity detecting unit, the position of the tracking point within an image which is not subjected to the block matching by the block matching unit, which is an image before or after an image to be processed within the moving image, having content at the same point-in-time as that of the image to be processed, is determined as the position of the tracking point within the image to be processed, and in a case where temporal discontinuity has not been detected by the discontinuity detecting unit, an intermediate point between the position of the tracking point within an image which is not subjected to the block matching by the block matching unit, which is an image before an image to be processed within the moving image, the position of the tracking point within an image which is not subjected to the block matching by the block matching unit, which is an image after an image to be processed within the moving image, is determined as the position of the tracking point within the image to be processed; and a motion vector calculating unit configured to obtain the motion vector of the tracking point from an image which is temporally prior to the image to be processed to the image to be processed based on the position of the tracking point within the image to be processed determined by the block matching unit or the interpolation unit.

The moving image of which the temporal discontinuity has been detected by the discontinuity detecting unit may be a moving image subjected to 2-3 pulldown conversion for dividing a frame image into two or three field images.

The moving image of which the temporal discontinuity has been detected by the discontinuity detecting unit may be a moving image subjected to 2-2 pulldown conversion for dividing a frame image into two field images.

The motion vector calculating unit may include: a first motion vector calculating unit configured to obtain the motion vector of the tracking point from an image which is temporally prior to the image to be processed to the image to be processed based on the position of the tracking point within the image to be processed determined by the interpolation unit; and a second motion vector calculating unit, based on the position of the tracking point within the image to be processed determined by the block matching unit, and the position of the tracking point within an image which is prior to the image to be processed determined by the interpolation unit, configured to obtain the motion vector of the tracking point from the previous image to the image to be processed.

According to an embodiment of the present invention, an information processing method for an information processing device configured to track the image of a tracking point which is a tracking target within a moving image, includes the steps of: performing block matching regarding some images of the moving image, wherein an image to be processed and an image which is temporally prior to the image to be processed are compared to determine the position of the tracking point within the image to be processed; detecting temporal discontinuity regarding the contents of multiple images which are continuous temporally in the moving image; performing interpolation processing wherein, in a case where temporal discontinuity has been detected, the position of the tracking point within an image which is not subjected to the block matching, which is an image before or after the image to be processed within the moving image, having content at the same point-in-time as that of the image to be processed, is determined as the position of the tracking point within the image to be processed, and in a case where temporal discontinuity has not been detected, an intermediate point between the position of the tracking point within an image which is not subjected to the block matching, which is an image before an image to be processed within the moving image, the position of the tracking point within an image which is not subjected to the block matching, which is an image after an image to be processed within the moving image, is determined as the position of the tracking point within the image to be processed; and obtaining the motion vector of the tracking point from an image which is temporally prior to the image to be processed to the image to be processed based on the position of the tracking point within determined the image to be processed.

According to an embodiment of the present invention, a program, arranged to track the image of a tracking point which is a tracking target within a moving image, causes a computer to execute the steps of: performing block matching regarding some images of the moving image, wherein an image to be processed and an image which is temporally prior to the image to be processed are compared to determine the position of the tracking point within the image to be processed; detecting temporal discontinuity regarding the contents of multiple images which are continuous temporally in the moving image; performing interpolation processing wherein, in a case where temporal discontinuity has been detected by the detecting temporal discontinuity processing, the position of the tracking point within an image which is not subjected to the block matching by the block matching processing, which is an image before or after the image to be processed within the moving image, having content at the same point-in-time as that of the image to be processed, is determined as the position of the tracking point within the image to be processed, and in a case where temporal discontinuity has not been detected by the detecting temporal discontinuity processing, an intermediate point between the position of the tracking point within an image which is not subjected to the block matching by the block matching processing, which is an image before an image to be processed within the moving image, the position of the tracking point within an image which is not subjected to the block matching, which is an image after an image to be processed within the moving image, is determined as the position of the tracking point within the image to be processed; and obtaining the motion vector of the tracking point from an image which is temporally prior to the image to be processed to the image to be processed based on the position of the tracking point within the image to be processed determined by the block matching processing or the interpolation processing.

According to the above configurations, block matching is performed regarding some images of the moving image, wherein an image to be processed and an image which is temporally prior to the image to be processed are compared to determine the position of the tracking point within the image to be processed, temporal discontinuity is detected regarding the contents of multiple images which are continuous temporally in the moving image, and in a case where temporal discontinuity has been detected, the position of the tracking point within an image which is not subjected to the block matching by the block matching processing, which is an image before or after the image to be processed within the moving image, having content at the same point-in-time as that of the image to be processed, is determined as the position of the tracking point within the image to be processed, and in a case where temporal discontinuity has not been detected, an intermediate point between the position of the tracking point within an image which is not subjected to the block matching by the block matching processing, which is an image before an image to be processed within the moving image, the position of the tracking point within an image which is not subjected to the block matching, which is an image after an image to be processed within the moving image, is determined as the position of the tracking point within the image to be processed, thereby performing interpolation processing, and obtaining the motion vector of the tracking point from an image which is temporally prior to the image to be processed to the image to be processed based on the position of the tracking point within the determined image to be processed.

According to embodiments of the present invention, information can be processed, and specifically, even in a case where the contents of field images or frames images which are continuous temporally are discontinuous temporally, a tracking target can be tracked accurately.

DESCRIPTION OF THE PREFERRED EMBODIMENTS

Figure 6:
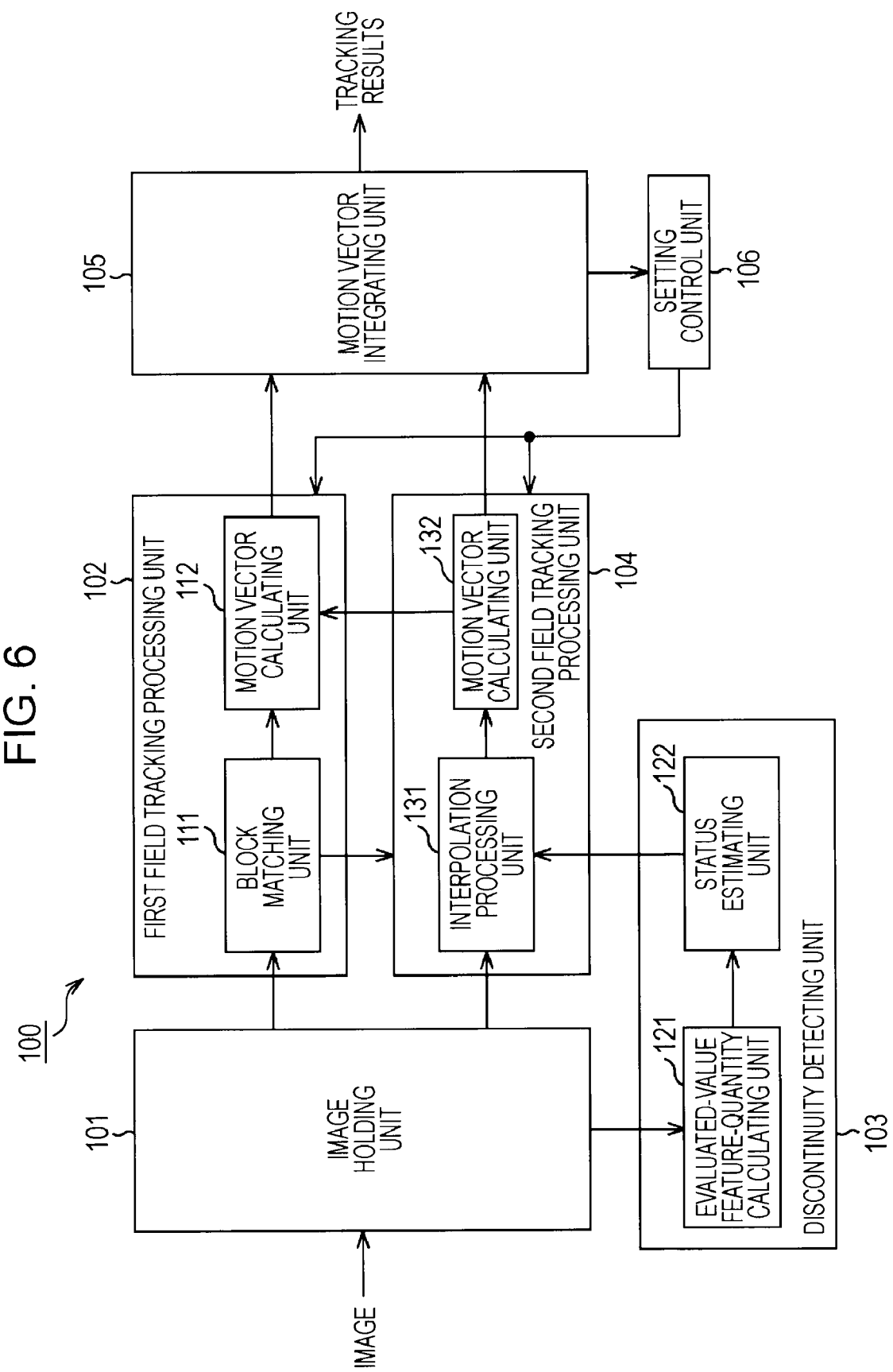
FIG. 6 is a block diagram illustrating a principal configuration example of a tracking processing device to which an embodiment of the present invention has been applied.

FIG. 6 is a block diagram illustrating a principal configuration example of a tracking processing device to which an embodiment of the present invention has been made. A tracking processing device 100 shown in FIG. 6 is a device which tracks a tracking target included in an image of input moving image data for each field (or frame), obtains the motion vector thereof, and outputs this as a tracking result.

Now, let us say that hereinafter, for convenience of explanation, a moving image to be processed employing the interlace method is input to the tracking processing device 100 in increments of fields, and is processed for each field. It goes without saying that an arrangement may be made wherein an input image employing the progressive method is input to the tracking processing device 100 in increments of frames, and is processed for each frame. In this case as well, each processing which will be described below is basically performed in the same way as the case of the interlace method only by replacing fields with frames (frames which will be described below are two frames which are continuous temporally). Accordingly, let us say that the following description is applicable to a case where a moving image employing the progressive method is processed unless description is made by separating a moving image employing the interlace method and a moving image employing the progressive method.

The tracking processing device 100 performs tracking processing each time a first field image is input. Specifically, upon a second field of a certain first frame, and a first field of the second frame thereof being input, the tracking processing device 100 performs tracking processing. Subsequently, upon a second field of the second frame being input, and further, a first field of the third frame being input, the next tracking processing is started.

With such tracking processing, a first field input this time will be referred to as the current first field, and a second field input this time will be referred to as the current second field.

That is to say, the current second field is the image of a frame which is temporally one frame before the current first field. Also, the first field of the same frame as the current second field (the first field which has already been input) will be referred to as a previous first field.

Also, let us say that a tracking target included in an image will be referred to as a tracking point, and a predetermined region including the tracking point thereof will be referred to as a tracking block. This block is a partial image making up a partial region of a field image. The image size and shape of this block may be any size and shape as long as the size and shape are determined beforehand, but for example, a rectangular region such as 32 pixels by 32 pixels is frequently employed.

Also, description will be made below assuming that the tracking processing of a first field is performed by block matching, and the tracking processing of a second field is performed by interpolation processing. It goes without saying that an arrangement may be made wherein the tracking processing of a second field is performed by block matching, and the tracking processing of a first field is performed by interpolation processing.

Now, in general, there are a great number of block matching techniques, and any technique may be employed as long as the motion vector of the position of a tracking point can be obtained, but hereafter, processing will be referred to as block matching wherein a block of interest of the previous first field, and a comparison target block most similar to the block of interest of the current first field are compared to obtain the similarity of mutual images, thereby obtaining a comparison target block most similar to the block of interest.

Note that, with this block matching, a block of interest represents a comparison source block, and a comparison target block represents a comparison destination block (block of which the similarity as to the block of interest is calculated). Also, one point serving as a reference (reference point) is set in a block. A positional relation between a block and the reference point thereof is determined beforehand, which is common to any block. Hereafter, the reference point of a block of interest will be referred to as a point of interest, and the reference point of a comparison target block will be referred to as a comparison point. Also, hereafter, let us say that a reference point is also a center point of the corresponding block.

As shown in FIG. 6, the tracking processing 100 includes an image holding unit 101, first field tracking processing unit 102, discontinuity detecting unit 103, second field tracking processing unit 104, motion vector integrating unit 105, and setting control unit 106.

The image holding unit 101 is configured of a storage medium, for example, such as semiconductor memory or the like, and holds an appropriate number of the respective field images of an input moving image to be input to the tracking processing device 100.

The first field tracking processing unit 102 performs the tracking processing for determining the position of a tracking point within a first field. The first field tracking processing unit 102 obtains the images of the previous first field and the current first field to perform the block matching.

That is to say, the first field tracking processing unit 102 determines, by the block matching, a comparison target block having the highest similarity as to the tracking block within the previous first field which has already been obtained, from the current first field, determines the comparison point of the comparison target block thereof as the tracking point within the current first field, and further determines the tracking point within the current second field, following which obtains a motion vector representing the motion of the position of the tracking point between the current first field and current second field. The first field tracking processing unit 102 supplies the obtained motion vector to the motion vector integrating unit 105.

Such a first field tracking processing unit 102 includes, as shown in FIG. 6, a block matching unit 111, and vector calculating unit 112.

The block matching unit 111 obtains each of the images of the previous first field and current first field from the image holding unit 101, and performs the block matching for comparing an image to be processed (current first field), and an image temporally prior to the image to be processed (previous first field) regarding some images (first field) of a moving image input with the tracking block within the first field as a block of interest (with the tracking point as a point of interest) based on information relating to the tracking results supplied from the setting control unit 106.

In general, the block matching processing is a technique widely employed for image processing, and accordingly, for example, in a case where the block matching processing is performed with another image processing within the device, the algorithm thereof may also be diverted. Note that, for example, with processing performed another device or another processing unit, in a case where the same block matching processing is performed, the block matching unit 111 may also employ the processing results thereof.

The block matching unit 111 supplies information (the position information of the tracking point within the current first field) regarding a comparison point (comparison target block) most matched to a point of interest, to the motion vector calculating unit 112 and second field tracking processing unit 104.

Following the motion vector of the tracking point from the previous first field to the current second field being obtained by a motion vector calculating unit 132 of the second field tracking processing unit 104, the motion vector calculating unit 112 obtains the motion vector of the tracking point from the previous first field to the current second field, from the motion vector calculating unit 132, employs information of the comparison point (comparison target block) of the current first field supplied from the block matching processing unit 111 to calculate the motion vector of the tracking point from the current second field to the current first field, and supplies the motion vector information thereof to the motion vector integrating unit 105.

Upon obtaining consecutive multiple field images from the image holding unit 101, the discontinuity detecting unit 103 employs, based on these, for example, the method described in Japanese Unexamined Patent Application Publication No. 2007-82040 to determine whether or not the respective images of fields which are continuous temporally in an input moving image are discontinuous temporally, and detects temporal discontinuity regarding the contents of the multiple images which are continuous temporally in the moving image. The discontinuity detecting unit 103 includes an evaluation-value feature-quantity calculating unit 121, and status estimating unit 122.

The evaluation-value feature-quantity calculating unit 121 obtains information relating to determination of temporal continuity of multiple field images which are continuous temporally in an input moving image, e.g., predetermined information such as evaluation value, threshold, feature quantity, or the like, and supplies such information to the status estimating unit 122.

Figure 1:
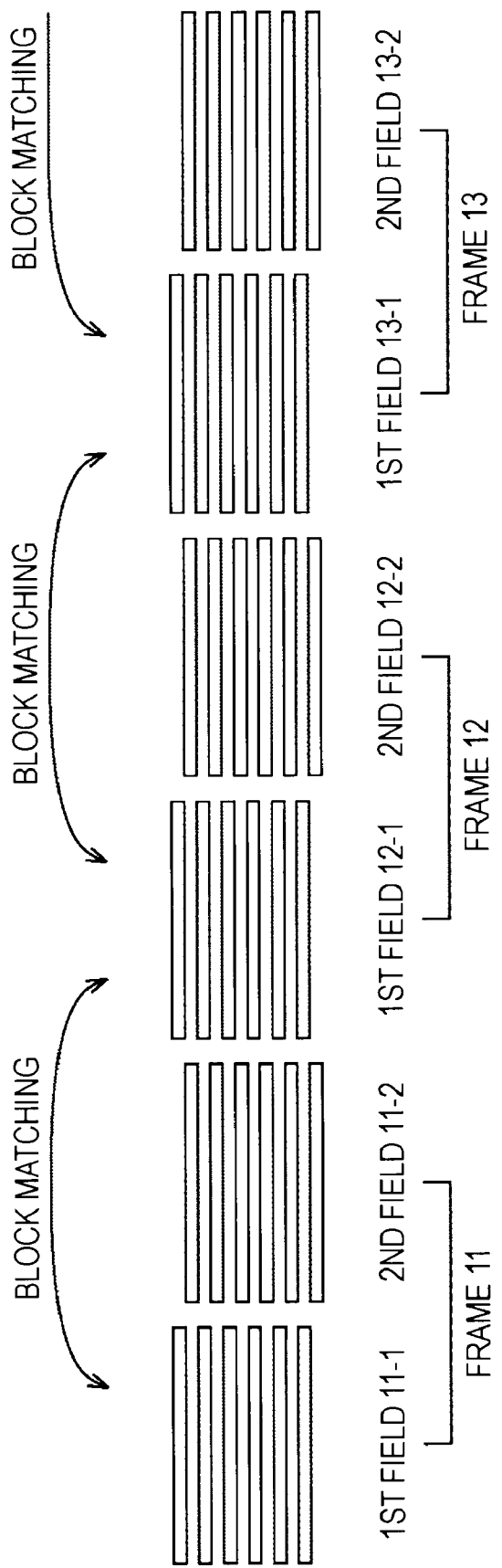
FIG. 1 is a diagram illustrating an example of a situation of tracking processing of a moving image according to the interlace method.
Figure 2:
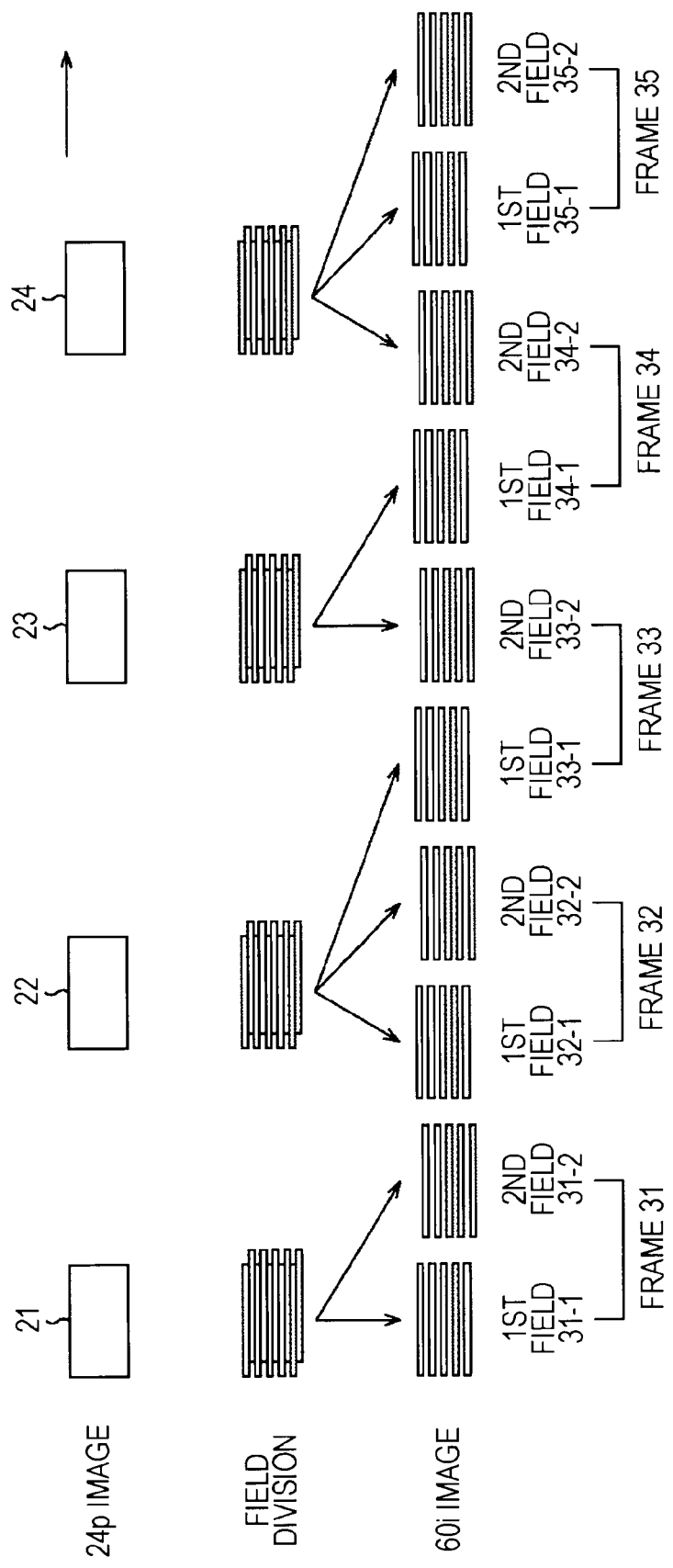
FIG. 2 is a diagram illustrating an example of a situation of 2-3 pulldown.
Figure 3:
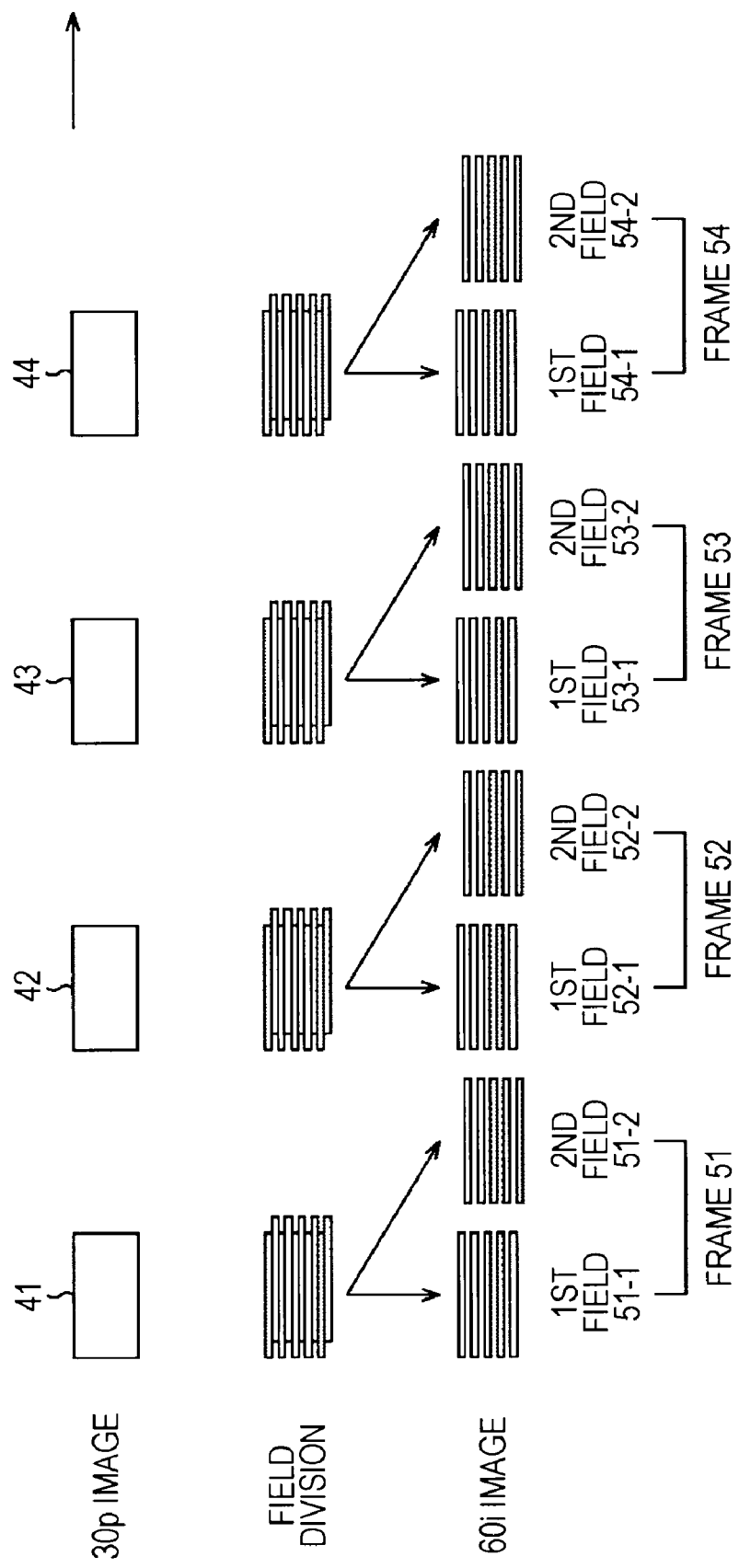
FIG. 3 is a diagram illustrating an example of a situation of 2-2 pulldown.

The status estimating unit 122 estimates, based on the information supplied from the evaluation-value feature-quantity calculating unit 121, whether or not an input moving image includes temporal discontinuous images, what kind of conversion has been performed, whether or not the input moving image has been subjected to conversion, and which status (field) in the conversion pattern thereof the current second field is equivalent to. For example, the status estimating unit 122 estimates, based on the information supplied from the evaluation-value feature-quantity calculating unit 121, that the input moving image includes temporal discontinuous images, which are 60i images obtained by subjecting a 24p image to 2-3 pulldown, and the current second field corresponds to a second field 33-2 of 2-3 pulldown conversion pattern shown in FIG. 2. The status estimating unit 122 supplies the estimation results thereof to an interpolation processing unit 131 of the second field tracking processing unit 104.

The second field tracking processing unit 104 obtains, based on the information supplied from the status estimating unit 122, the motion vector of the tracking point within the current second field by interpolation processing employing the motion vectors of surrounding fields.

The second field tracking processing unit 104 includes the interpolation processing unit 131, and motion vector calculating unit 132. The interpolation processing unit 131 determines the tracking point with reference to the positions of the tracking points of fields which are continuous temporally forward and backward by the method according to the information supplied from the status estimating unit 122.

For example, in a case where determination is made that an input moving image does not include temporal discontinuous images (i.e., in a case where temporal discontinuity has not been detected), the interpolation processing unit 131 determines, based on the information of the integrated value of tracking vectors (the position information of the tracking point within the previous first field) supplied from the setting control unit 106, and the position information of the tracking point within the current first field supplied from the block matching unit 111, an intermediate point between the positions of tracking points within the previous first field and current first field as the position of the tracking point within the current second field.

Also, in a case where determination is made that the input moving image includes temporal discontinuous images (i.e., in a case where temporal discontinuity has been detected), the interpolation processing unit 131 selects an image having the same point-in-time as the current second field, of the previous first field and current first field, based on the information indicating which field of conversion patterns the current second field is equivalent to, supplied from the status estimating unit 122, and takes, based on the position information of the tracking point in the previous first field supplied from the setting control unit 106, or the position information of the tracking point within the current first field supplied from the block matching unit 111, the position of the tracking point of the field thereof as the position of the tracking point within the current second field.

The motion vector calculating unit 132 calculates, based on the information of the integrated value of tracking vectors (the position information of the tracking point within the previous first field) supplied from the setting control unit 106, and the position of the tracking point within the current second field determined as described above, the motion vector of the tracking point from the previous first field to the current second field. The motion vector calculating unit 132 supplies the motion vector calculated as described above to the motion vector integrating unit 105, and supplies this to the motion vector calculating unit 112.

Note that description has been made that the motion vector calculating unit 112 employs the processing result (motion vector) of the motion vector calculating unit 132, but an arrangement may be made wherein the processing result (the position of the tracking point within the current second field) of the interpolation processing unit 131 is obtained, and this is employed to calculate the motion vector of the tracking point from the current second field to the current first field. Also, the motion vector calculating unit 112 and motion vector calculating unit 132 may be integrated into a single processing unit.

The motion vector integrating unit 105 integrates the motion vector supplied for each field from the first field tracking processing unit 102 or second field tracking processing unit 104 (adds this to the integration result of the motion vectors which have been calculated so far), outputs the integration result to the outside of the tracking processing device 100 as a tracking result, and supplies this to the setting control unit 106. Also, the motion vector integrating unit 105 holds the integration result thereof to employ this for integration of the next motion vector.

The setting control unit 106 supplies, based on the tracking result supplied from the motion vector integrating unit 105, the position information of the tracking point (and tracking block) to the first field tracking processing unit 102 and second field tracking processing unit 104.

Next, description will be made regarding an example of the flow of the tracking processing executed by the tracking processing device 100 in FIG. 6 with reference to the flowchart in FIG. 7.

Upon a second field image and a first field image of the next frame thereof being input, the tracking processing device 100 starts the tracking processing. In step S1, the image holding unit 101 holds the data of the input field images (input images). In step S2, the block matching unit 111 of the first field tracking processing unit 102 performs block matching tracking processing. The details of this block matching tracking processing will be described later.

In step S3, the discontinuity detecting unit 103 performs detection of discontinuity regarding the input images input to the tracking processing device 100. The details of this discontinuity detection processing will be described later. Upon the discontinuity detection processing being completed, in step S4 the second field tracking processing unit 104 performs interpolation processing according to the detection result obtained by the processing in step S3. The details of this interpolation processing will be described later. Upon the processing in step S4 being completed, in step S5 the motion vector calculating unit 132 of the first field tracking processing unit 104 obtains the motion vector of the tracking point from the current second field to the current first field.

In step S6, the motion vector integrating unit 105 further adds the motion vector of the tracking point obtained as the processing result in step S4 or step S5 to the integration result of the motion vectors of the tracking point obtained so far, thereby performing integration.

In step S7, the setting control unit 106 supplies the tracking result (the integration result of the motion vector calculated in step S6) to the first field tracking processing unit 102 and second field tracking processing unit 104 to reflect this to each tacking point setting.

Upon the processing in step S7 being completed, the setting control unit 106 ends the tracking processing.

The tracking processing device 100 repeats the tracking processing as described above each time a first field image is input.

Next, description will be made regarding a detailed example of the flow of the block matching tracking processing executed in step S2 in FIG. 7 with reference to the flowchart in FIG. 8.

Upon the block matching tracking processing being started, in step S21 the block matching unit 111 determines the tracking point and tracking block within the previous first field.

In step S22, the block matching unit 111 performs block matching between first fields (i.e., the previous first field and current first field) between consecutive frames to determine the tracking point within the current first field. The block matching unit 111 performs block matching between the previous first field and the current first field, thereby determining a comparison target block within the current first field, which has the highest similarity as to the tracking block of the previous first field, and determining the comparison point of the comparison target block thereof as the tracking point within the current first field.

Figure 7:
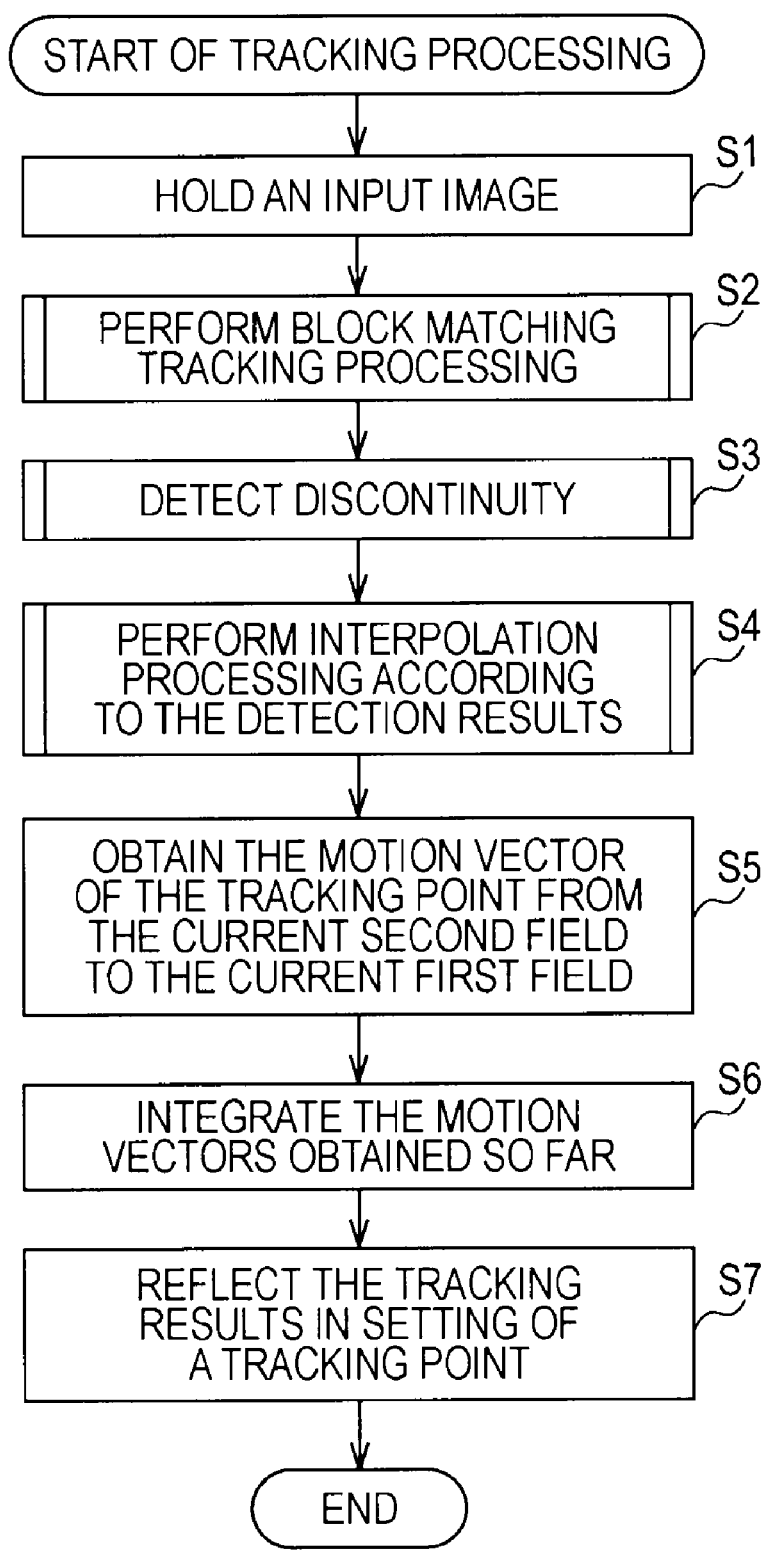
FIG. 7 is a flowchart for describing an example of the flow of the tracking processing.
Figure 8:
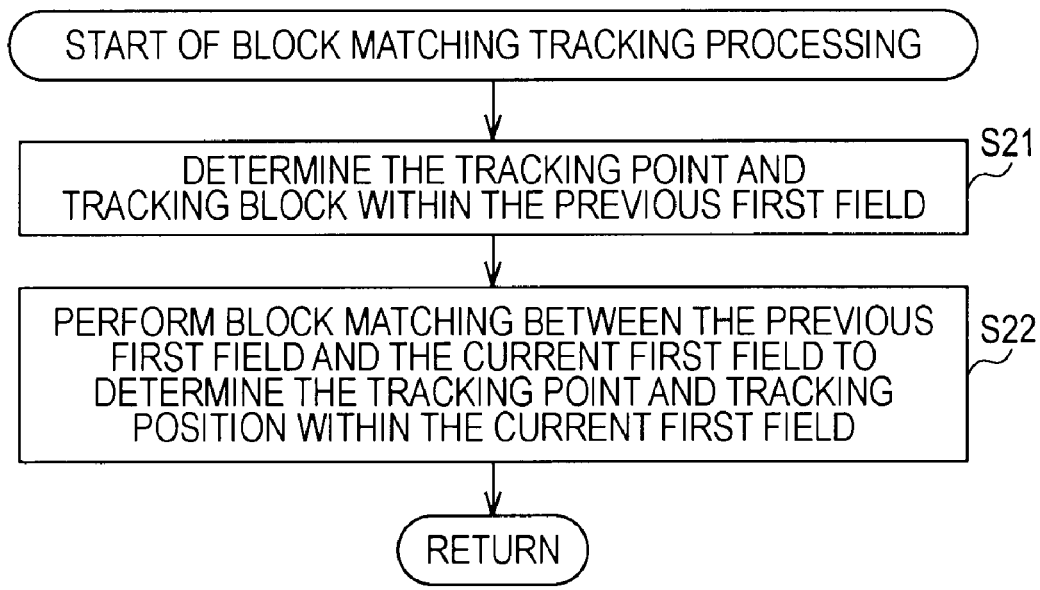
FIG. 8 is a flowchart for describing an example of the flow of block matching tracking processing.

Upon the position of the tracking point within the current first field being determined, the block matching unit 111 ends the block matching tracking processing, returns the processing to step S2 in FIG. 7, and executes the processing in step S3 and thereafter.

Next, description will be made regarding an example of the detailed flow of the discontinuity detection processing executed in step S3 in FIG. 7 with reference to the flowchart in FIG. 9.

Upon the discontinuity detection processing being started, in step S41 the evaluation-value feature-quantity calculating unit 121 employs, for example, the method described in Japanese Unexamined Patent Application Publication No. 2007-82040 to obtain predetermined information for detection of discontinuity, such as an evaluation value, threshold, feature quantity, and so forth. Upon the information being obtained, in step S42 the status estimating unit 122 employs, for example, the method described in Japanese Unexamined Patent Application Publication No. 2007-82040 to estimate whether or not the conversion has been performed, the conversion method, and the current status, based on the information obtained in the processing in step S41.

Upon the processing in step S42 being completed, the status estimating unit 122 ends the discontinuity detection processing, returns the processing to step S3 in FIG. 7, and executes the processing in step S4 and thereafter.

Figure 10:
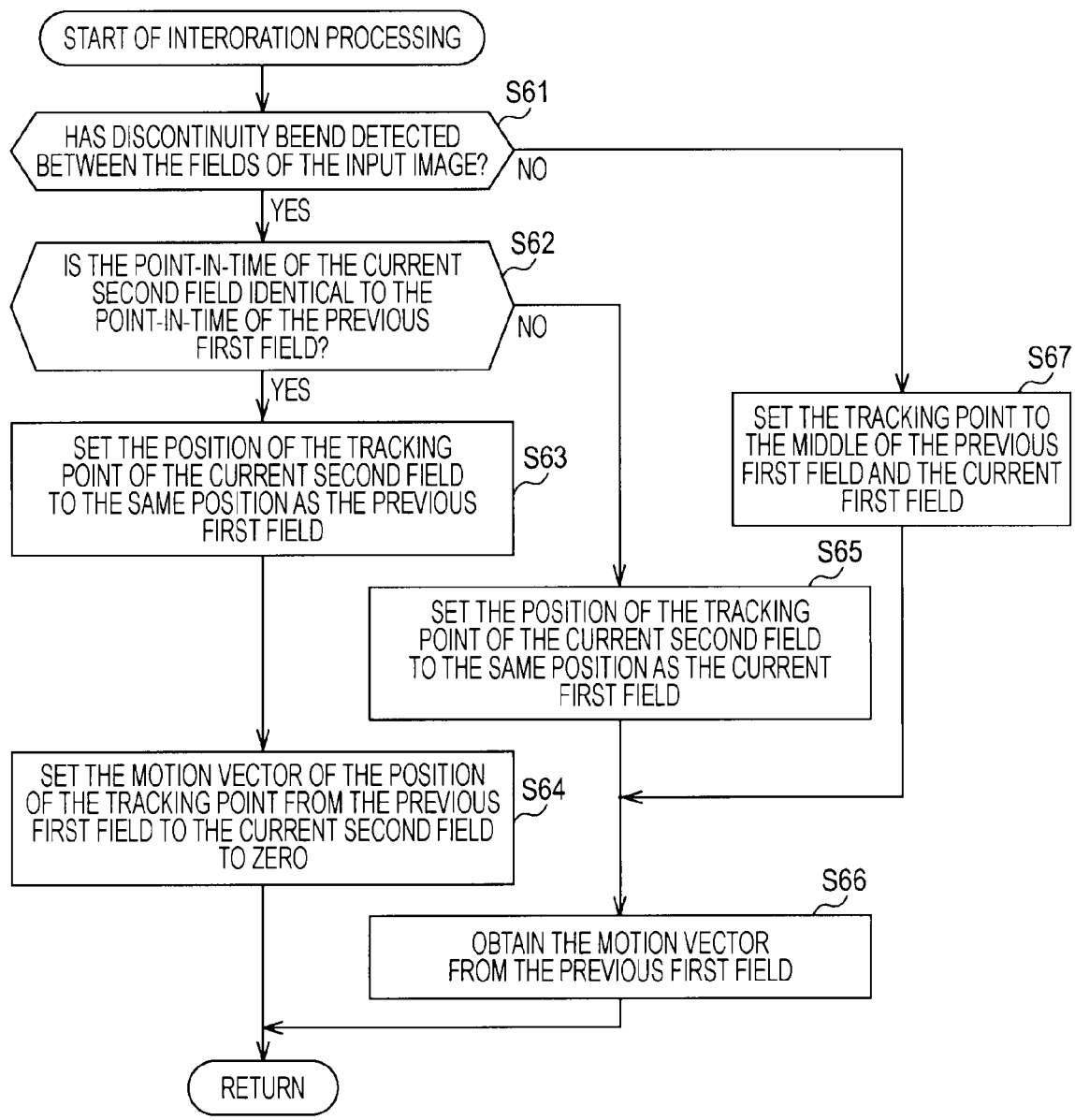
FIG. 10 is a flowchart for describing an example of the flow of interpolation processing.

Next, description will be made regarding the interpolation processing executed in step S4 in FIG. 7 with reference to the flowchart in FIG. 10.

Figure 9:
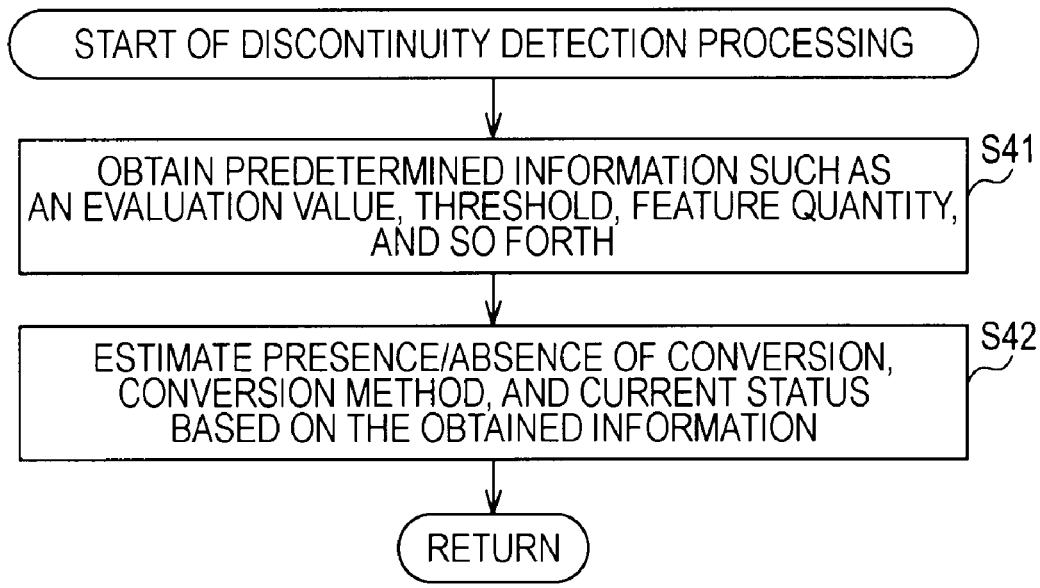
FIG. 9 is a flowchart for describing an example of the flow of discontinuity detection processing.

Upon the interpolation processing being started, in step S61 the interpolation processing unit 131 of the second field tracking processing unit 104 determines whether or not discontinuity has been detected between the fields of the input image based on the estimation results obtained in step S42 in FIG. 9. In a case where determination is made that discontinuity has been detected, the interpolation processing unit 131 advances the processing to step S62, and determines whether or not the point-in-time of the image of the current second field is identical to the point-in-time of the image of the previous first field based on the estimation results obtained in step S42 in FIG. 9.

In a case where the images of the previous first field and the current second field are made up of the same frame image, and the points in time between both are matched, the interpolation processing unit 131 advances the processing to step S63, and sets the position of the tracking point of the current second field to the same position of the previous first field. That is to say, in this case, the position of the tracking point does not change between the previous first field and the current first field, so in step S64 the motion vector calculating unit 132 sets the motion vector of the position of the tracking point from the previous first field to the current second field to zero, ends the interpolation processing, returns the processing to step S4 in FIG. 7, and executes the processing in step S5 and thereafter.

Also, in a case where determination is made in step S62 that the point-in-time of the image of the current second field is not identical to the point-in-time of the image of the previous first field, the interpolation processing unit 131 advances the processing to step S65. In this case, the image of the current second field is made up of the same frame image as the image of the current first field. That is to say, the point-in-time of the image of the current second field is identical to the point-in-time of the image of the previous first field. Accordingly, in step S65 the interpolation processing unit 131 sets the position of the tracking point of the current second field to the same position as the current first field. In this case, there is a possibility that the position of the tacking point changes between the previous first field and the current second field, so in step S66 the motion vector calculating unit 132 obtains the motion vector from the previous first field. In this case, the motion vector of the position of the tracking point from the current second field to the current first field calculated in step S5 in FIG. 7 becomes zero. Upon the motion vector being obtained, the motion vector calculating unit 132 ends the interpolation processing, returns the processing to step S4 in FIG. 7, and executes the processing in step S5 and thereafter.

Also, in a case where determination is made in step S61 that discontinuity has not been detected between the fields of the input image, the interpolation processing unit 131 advances the processing to step S67, sets the position of the tracking point of the current second field to the middle of the positions of the tracking points of the previous first field and the current first field, and returns the processing to step S66. In step S66, the motion vector calculating unit 132 obtains the motion vector of the tracking point from the previous first field to the current second field.

As described above, upon the processing in step S64 or processing in step S66 being performed, the motion vector calculating unit 132 ends the interpolation processing.

As described above, in a case where the field images are discontinuous, the tracking processing device 100 determines the position of the tracking point with reference to a field having the same point-in-time, of one field before or one field after. Thus, the tracking processing device 100 can track a tracking target accurately, even in a case where the contents of field images or frame images which are continuous temporally are discontinuous temporally.

Description will be made regarding a specific example of a tracking situation in such a case of a moving image wherein temporal consecutive fields or frames are configured of temporal discontinuous images, with reference to FIGS. 11 and 12.

Figure 4:
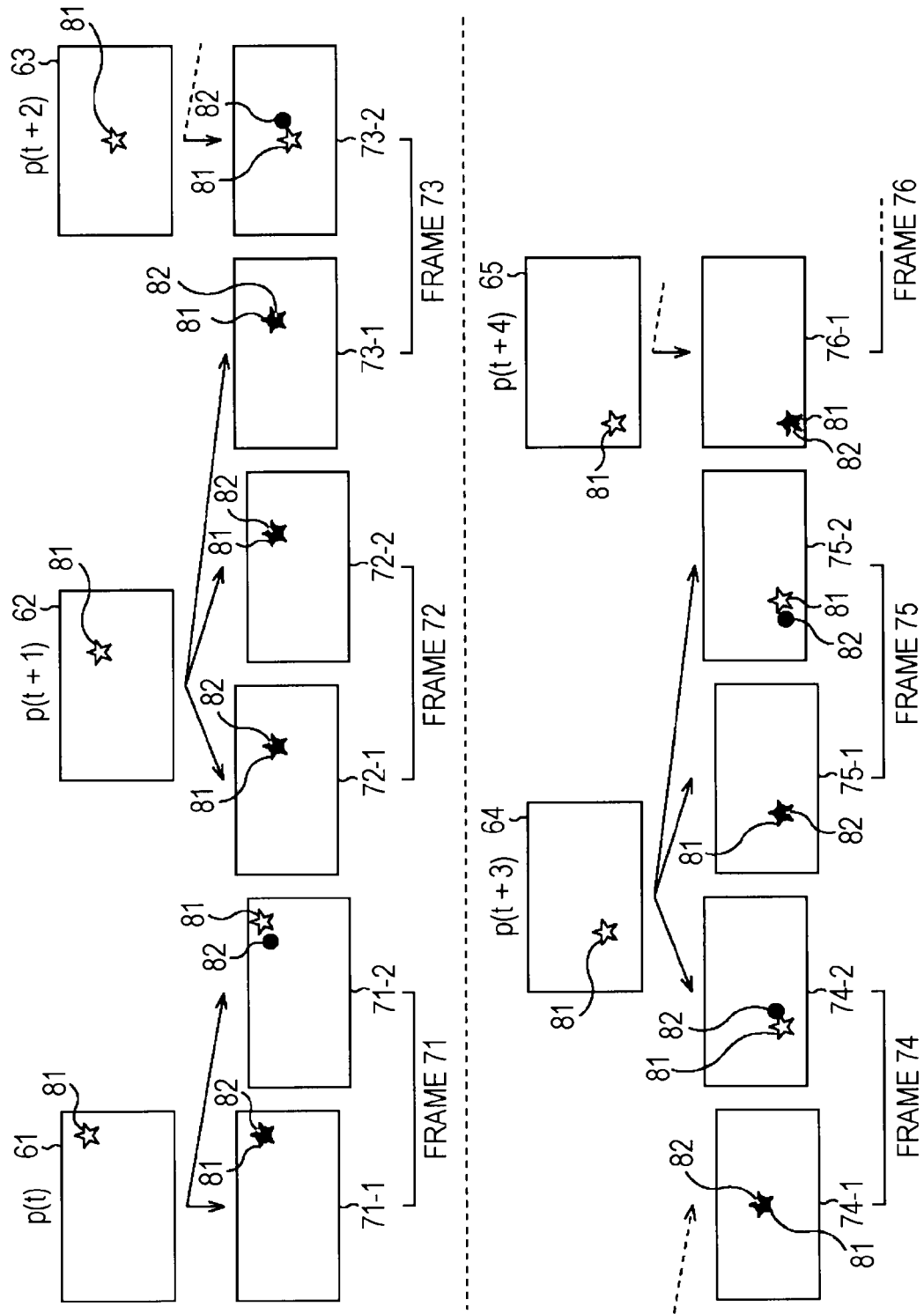
FIG. 4 is a diagram illustrating an example of tracking processing of a moving image generated by 2-3 pulldown.
Figure 5:
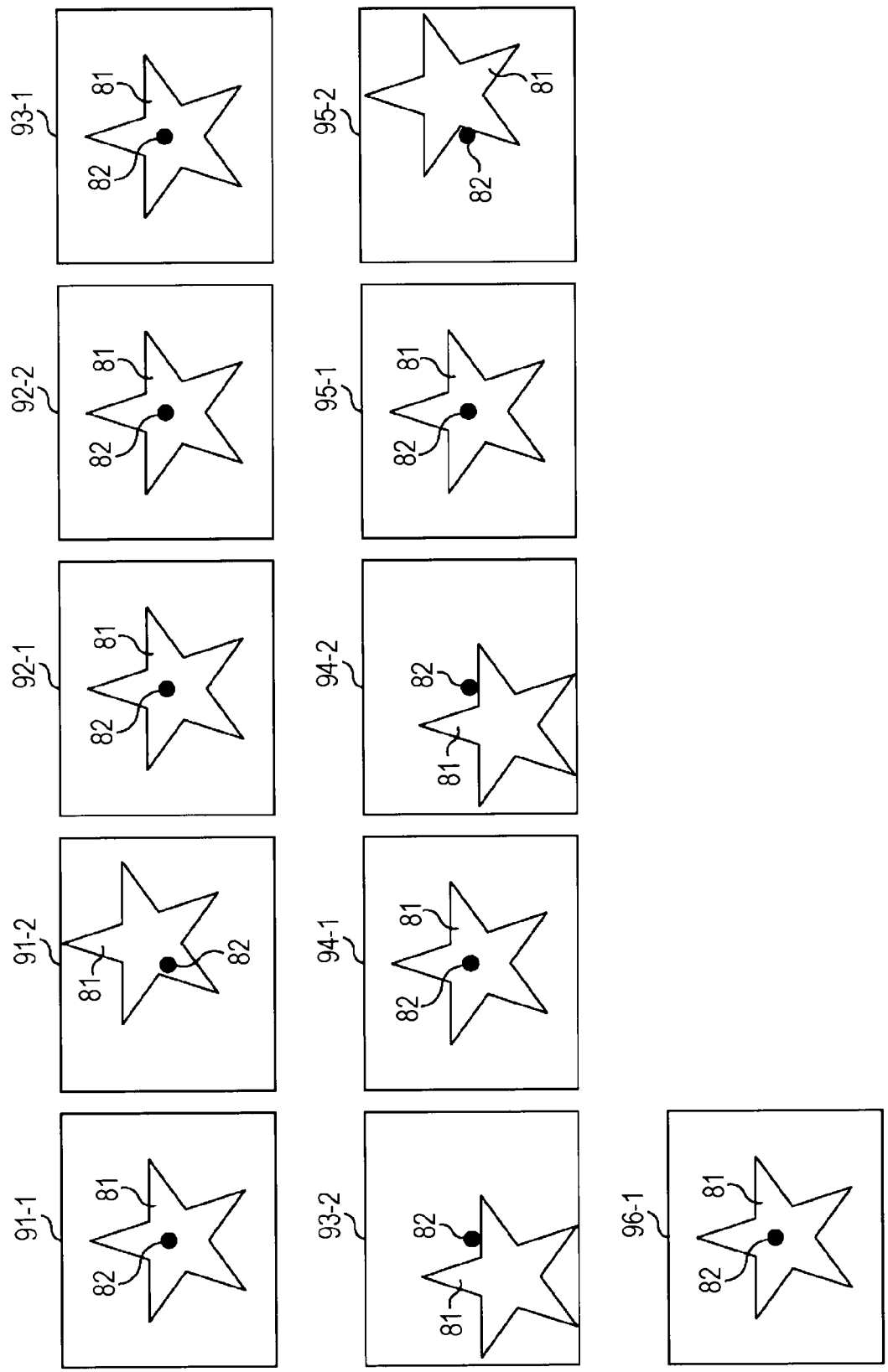
FIG. 5 is a diagram illustrating an example of an enlarged image with the tracking point in the example of FIG. 4 as the center.
Figure 11:
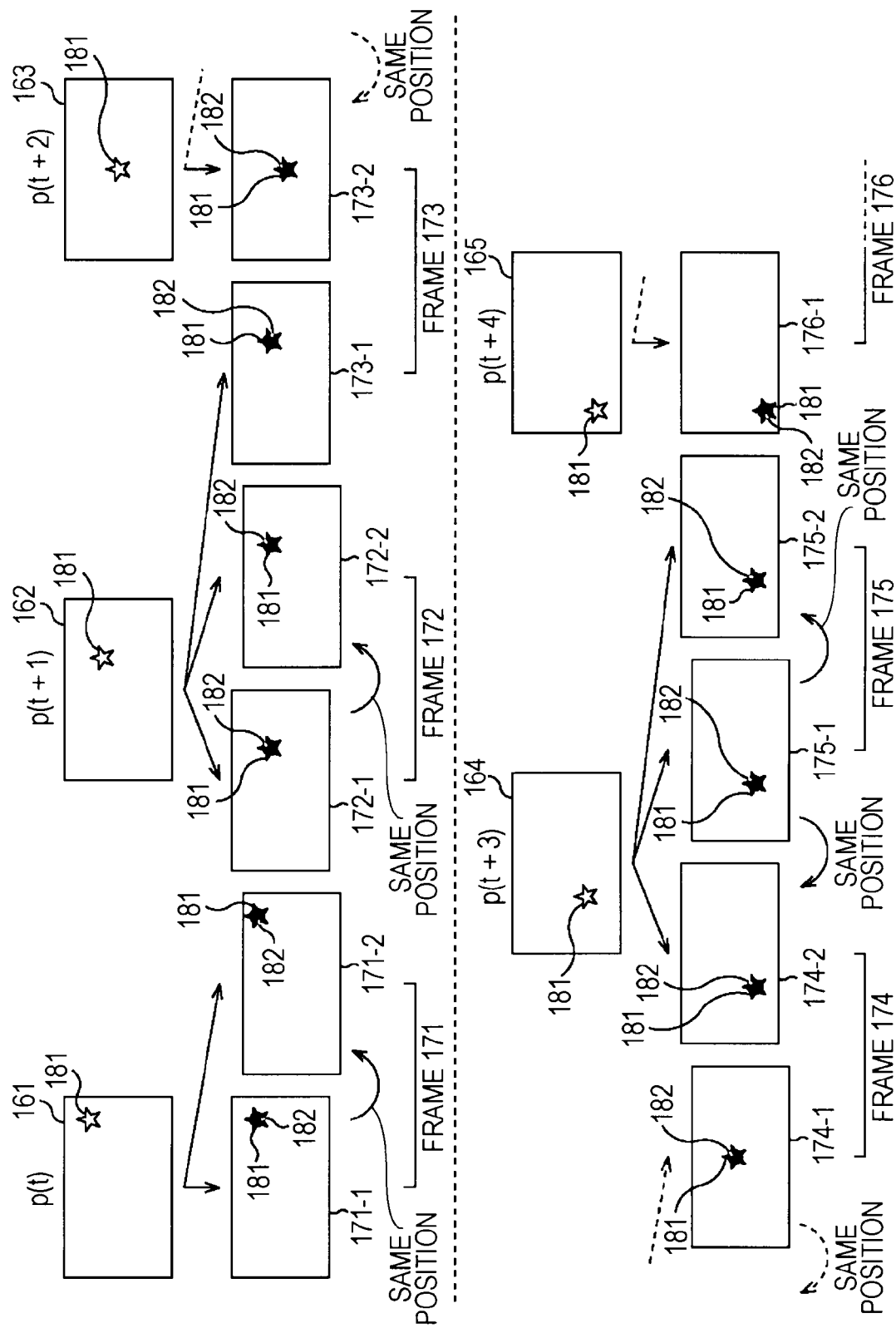
FIG. 11 is a diagram illustrating an example of a 60i image obtained by subjecting a 24p image to 2-3 pulldown.

FIG. 11 illustrates an example in a case of 60i images obtained by subjecting a 24p image to 2-3 pulldown. FIG. 11 is diagram corresponding to FIG. 4. FIG. 11 is, similar to FIG. 4, divided into a top stage and bottom stage by a dotted line around the middle, and order proceeding from the left side to right side of the top stage, and order proceeding from the left side to right side of the bottom stage represent time series. Frames 161 through 165 shown in the upper side of each of the top stage and bottom stage illustrate frame images which are continuous temporally before 2-3 pulldown. For example, the frame 161 is a frame image at point-in-time t, and similarly, the frame 162 is a frame image at point-in-time (t+1), and the frame 165 is a frame image at point-in-time (t+4).

Fields 171-1 through 176-1 shown on the lower side of each of the top stage and bottom stage illustrate field images which are continuous temporally after 2-3 pulldown. Arrows illustrate relative relations between a frame and fields. For example, the field 171-1 which is a first field of a frame 171 within the 60i image, and the field 171-2 which is a second field of the frame 171 are fields converted and generated from the frame 161 which is a 24p image.

Similarly, the field 172-1 which is a first field of a frame 172 within the 60i image, the field 172-2 which is a second field of the frame 172, and the field 173-1 which is a first field of a frame 173, are fields converted and generated from the frame 162 which is a 24p image. Also, the field 173-2 which is a second field of the frame 173 within the 60i image, and the field 174-1 which is a first field of a frame 174 are fields converted and generated from the frame 163 which is a 24p image. Further, the field 174-2 which is a second field of the frame 174 within the 60i image, the field 175-1 which is a first field of a frame 175, and the field 175-2 which is a second field of a frame 175 are fields converted and generated from the frame 164 which is a 24p image. The field 176-1 which is a first field of a frame 176 within the 60i image is a field converted and generated from the frame 165 which is a 24p image.

Tracking targets 181 which are star-shaped images shown in the respective frames and fields are images to be tracked by the tracking processing. P(t) illustrates the position of a tracking target 181 (at point-in-time t) within the frame 161, P(t+1) illustrates the position of a tracking target 181 (at point-in-time t+1) within the frame 162, P(t+2) illustrates the position of a tracking target 181 (at point-in-time t+2) within the frame 163, P(t+3) illustrates the position of a tracking target 181 (at point-in-time t+3) within the frame 164, and P(t+4) illustrates the position of a tracking target 181 (at point-in-time t+4) within the frame 165.

Also, tracking points 182 shown in filled circles in the fields 171-1 through 176-1 represent processing results (tracking results at that time) of the tracking processing. Now, let us say that tracking is performed regarding the first fields of each frame by employing the block matching, and tracking is performed regarding the second fields by employing the tracking points of the first fields which are continuous forward and backward to perform interpolation.

With such an example in FIG. 11, with regard to the fields 171-1, 172-1, 173-1, 174-1, 175-1, and 176-1 which are the first fields of the respective frames, a tracking destination is obtained by the block matching, so the positions of the tracking targets 181 and tracking points 182 are basically matched.

However, with the moving image shown in FIG. 11 subjected to 2-3 pulldown, the fields are discontinuous, so according to the tracking processing as described above, of the second fields, for example, the tracking point 182 of the field 171-2 is set to the position of the tracking point 182 within the field 171-1 which is an image having the same point-in-time as the field 171-2.

Also, similarly, the tracking point 182 of the field 172-2 is set to the position of the tracking point 182 within the field 172-1 which is an image having the same point-in-time, the tracking point 182 of the field 173-2 is set to the position of the tracking point 182 within the field 174-1 which is an image having the same point-in-time, the tracking point 182 of the field 174-2 is set to the position of the tracking point 182 within the field 175-1 which is an image having the same point-in-time, and the tracking point 182 of the field 175-2 is set to the position of the tracking point 182 within the field 175-1 which is an image having the same point-in-time.

Accordingly, with not only the first fields but also the second fields, the positions of the tracking points 182 are identical to the tracking targets 181.

Figure 12:
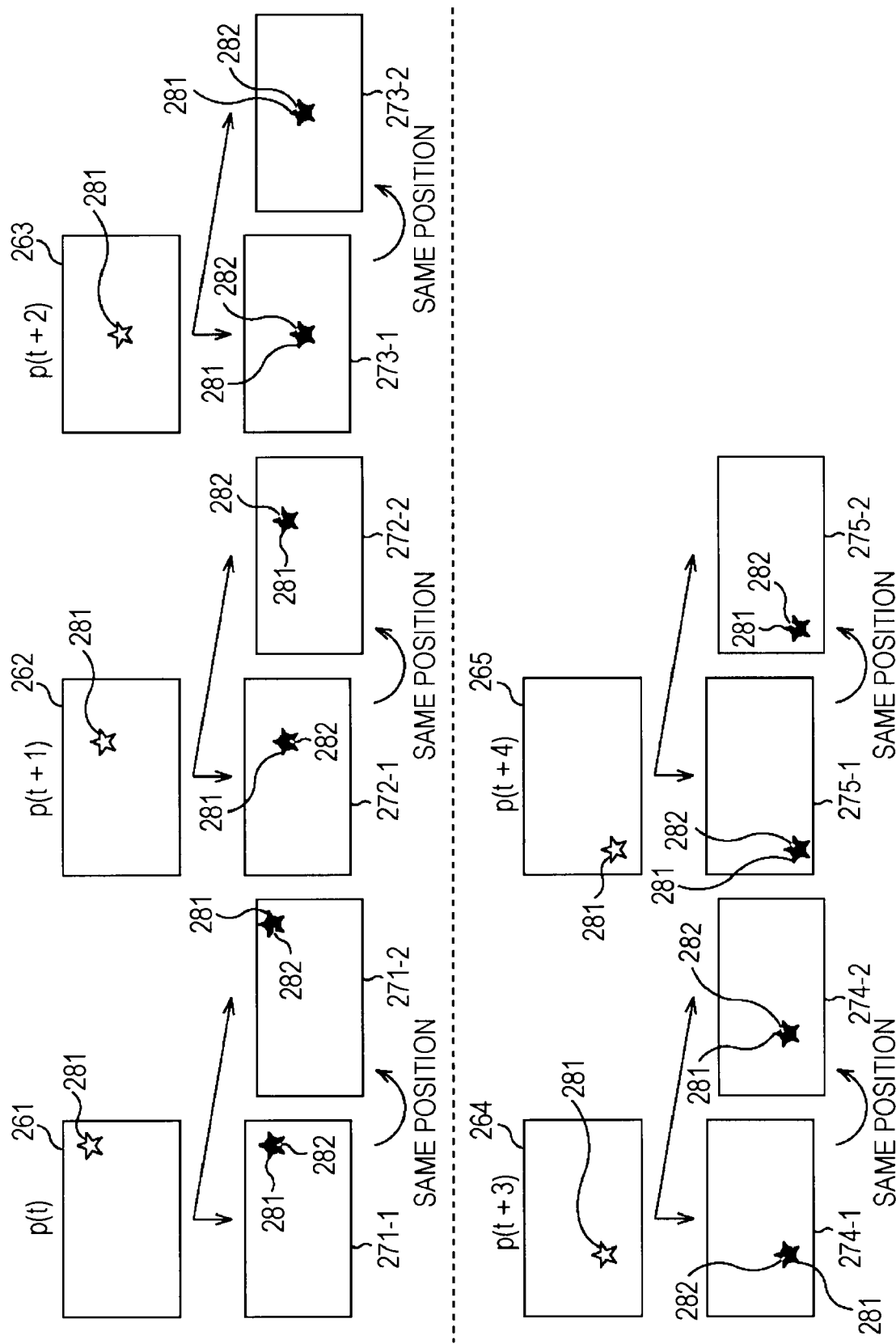
FIG. 12 is a diagram illustrating an example of a 60i image obtained by subjecting a 30p image to 2-2 pulldown.

FIG. 12 illustrates an example in a case of 60i images obtained by subjecting a 30p image to 2-2 pulldown. FIG. 12 is a diagram corresponding to FIG. 11. FIG. 12 is, similar to FIG. 11, divided into a top stage and bottom stage by a dotted line around the middle, and order proceeding from the left side to right side of the top stage, and order proceeding from the left side to right side of the bottom stage represent time series. Frames 261 through 265 shown in the upper side of each of the top stage and bottom stage illustrate frame images which are continuous temporally before 2-2 pulldown. For example, the frame 261 is a frame image at point-in-time t, and similarly, the frame 262 is a frame image at point-in-time (t+1), and the frame 265 is a frame image at point-in-time (t+4).

Fields 271-1 through 275-2 shown on the lower side of each of the top stage and bottom stage illustrate field images which are continuous temporally after 2-2 pulldown. Arrows illustrate relative relations between a frame and fields. For example, the fields 271-1 and 271-2 which are fields converted and generated from the frame 261.

Tracking targets 281 which are star-shaped images shown in the respective frames and fields are images to be tracked by the tracking processing. P(t) illustrates the position of a tracking target 281 (at point-in-time t) within the frame 261, P(t+1) illustrates the position of a tracking target 281 (at point-in-time t+1) within the frame 262, P(t+2) illustrates the position of a tracking target 281 (at point-in-time t+2) within the frame 263, P(t+3) illustrates the position of a tracking target 281 (at point-in-time t+3) within the frame 264, and P(t+4) illustrates the position of a tracking target 281 (at point-in-time t+4) within the frame 265.

Also, tracking points 282 shown in filled circles in the fields 271-1 through 275-2 represent processing results (tracking results at that time) of the tracking processing. Now, let us say that tracking is performed regarding the first fields of each frame by employing the block matching, and tracking is performed regarding the second fields by employing the tracking points of the first fields which are continuous forward and backward to perform interpolation.

With such an example in FIG. 12, with regard to the fields 271-1, 272-1, 273-1, 274-1, and 275-1 which are the first fields of the respective frames, a tracking destination is obtained by the block matching, so the positions of the tracking targets 281 and tracking points 282 are basically matched.

However, with the moving image shown in FIG. 12 subjected to 2-2 pulldown, the fields are discontinuous, so according to the tracking processing as described above, of the second fields, for example, the tracking point 282 of the field 271-2 is set to the position of the tracking point 282 within the field 271-1 which is an image having the same point-in-time as the field 271-2.

Also, similarly, the tracking point 282 of the field 272-2 is set to the position of the tracking point 282 within the field 272-1 which is an image having the same point-in-time, the tracking point 282 of the field 273-2 is set to the position of the tracking point 282 within the field 273-1 which is an image having the same point-in-time, the tracking point 282 of the field 274-2 is set to the position of the tracking point 282 within the field 274-1 which is an image having the same point-in-time, and the tracking point 282 of the field 275-2 is set to the position of the tracking point 282 within the field 275-1 which is an image having the same point-in-time.

Accordingly, with not only the first fields but also the second fields, the positions of the tracking points 282 are identical to the tracking targets 281.

As described above, the tracking processing device 100 can track a tracking target more accurately regardless of pulldown methods.

An arrangement may be made wherein the tracking processing device 100 is taken as a tracking processing unit, and is embedded in a device for performing other processing.

Figure 13:
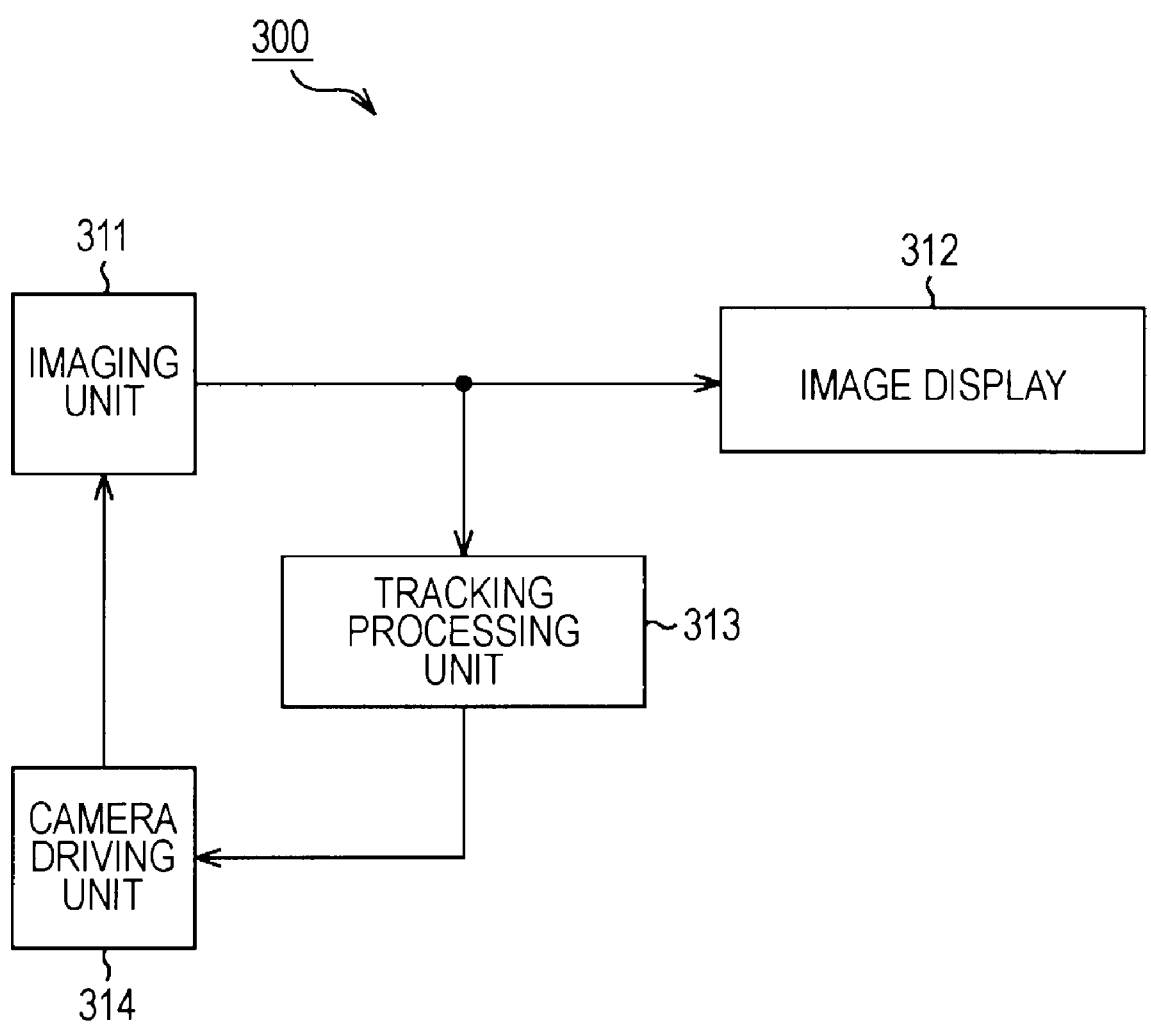
FIG. 13 is a block diagram illustrating a principal configuration example of a surveillance camera device to which an embodiment of the present invention has been applied.

FIG. 13 is a block diagram illustrating a configuration example of a surveillance camera device to which an embodiment of the present invention has been applied. A surveillance camera device 300 shown in FIG. 13 is a device employed for monitoring a predetermined room, district, or the like through an image, and is a device by applying tracking processing result as to an imaged image, such as described above, to camera control processing.

The surveillance camera device 300 displays an image taken by an imaging unit 311 made up of, for example, a CCD video camera or the like, on an image display 312. The user (watcher) browses the image thereof displayed on the image display 312, thereby understanding (monitoring) the situation of space imaged by the imaging unit 311.

The tracking processing unit 313 subjects the image input by the imaging unit 311 to the tracking processing as described above to detect a predetermined tracking target within the current image, and supplies the detection result thereof to a camera driving unit 314. The camera driving unit 314 drives the imaging unit 311 so as to track the tracking target thereof, and performs, for example, adjustment such as zooming or focusing, tilting or panning or the like, or shooting of a still image.

As described above, even in a case of a moving image in which the contents of temporal consecutive field images or frame images are discontinuous temporally, the tracking processing unit 313 can track a tracking target more accurately, and the camera driving unit 314 can drive the imaging unit 311 more appropriately. That is to say, the surveillance camera device 300 can perform more appropriate surveillance operation.

Obviously, the tracking processing unit to which an embodiment of the present invention has been applied is not restricted to a surveillance camera device, and application can be made to any kind of device as long as the device performs processing employing discontinuous detection results.

The above-mentioned series of processing may be executed by hardware, or may be executed by software. In this case, for example, the hardware may be configured as a personal computer such as shown in FIG. 14.

Figure 14:
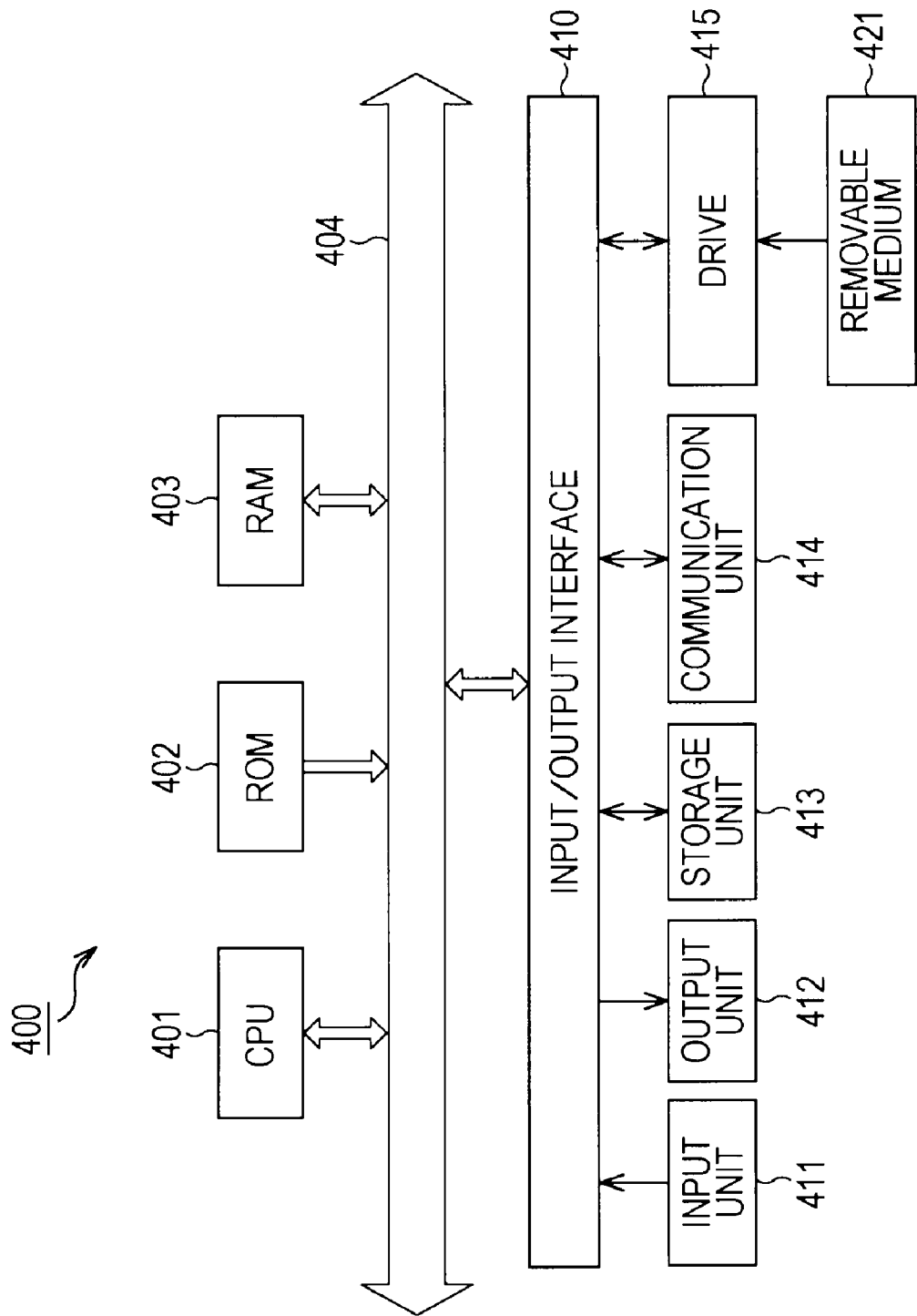
FIG. 14 is a block diagram illustrating a configuration example of a personal computer to which an embodiment of the present invention has been applied.

In FIG. 14, a CPU (Central Processing Unit) 401 of a personal computer 400 executes various types of processing in accordance with a program stored in ROM (Read Only Memory) 402, or a program loaded to RAM (Random Access Memory) 403 from a storage unit 413. The RAM 403 also stores data for the CPU 401 executing various types of processing, as appropriate.

The CPU 401, ROM 402, and RAM 403 are connected mutually through a bus 404. The bus 404 is also connected with an input/output interface 410.

The input/output interface 410 is connected with an input unit 411 made up of a keyboard, mouse, and so forth, display made up of a CRT (Cathode Ray Tube), LCD (Liquid Crystal Display), or the like, output unit 412 made up of a speaker or the like, storage unit 413 configured of a hard disk or the like, and communication unit 414 configured of a modem or the like. The communication unit 414 performs communication processing through a network which may include the Internet.

The input/output interface 410 is also connected with a drive 415 as appropriate, on which a removable medium 421 such as a magnetic disk, optical disc, magneto-optical disk, semiconductor memory, or the like is mounted as appropriate, and a computer program read out therefrom is installed in the storage unit 413 as appropriate.

In a case where the above-mentioned series of processing is executed by software, a program making up the software thereof is installed from a network or recording medium.

This recording medium is not only configured of, for example, as shown in FIG. 14, the removable medium 421 made up of a magnetic disk (including a flexible disk), optical disc (including CD-ROM (Compact Disc-Read Only Memory), DVD (Digital Versatile Disc)), magneto-optical disk (including MD (Mini Disc)), semiconductor memory, or the like, in which the program is recorded, which will be distributed for distributing the program to a user separately from the device main unit, but also configured of the ROM 402 in which the program is recorded, which will be distributed for subscribing the program to a user in a state embedded in the device main unit beforehand, or a hard disk included in the storage unit 413, or the like.

Note that the respective steps according to the present Specification include not only processing performed in time sequence in accordance with the described sequence but also processing not necessarily performed in time sequence but performed in parallel or individually.

Also, with the present Specification, the term "system" represents the entirety of equipment configured of multiple devices.

Note that, with the above description, an arrangement may be made wherein the configuration described as a single device is divided, and is configured as multiple devices. Conversely, the configurations described as multiple devices may be integrated as a single device. Also, it goes without saying that configurations other than the above-mentioned configurations may be included in the configuration of each device. Further, in a case where the configuration and operation as the entire system is substantially the same, a portion of the configuration of a certain device may be included in the configuration of another device. That is to say, the embodiments of the present invention are not restricted to the above-mentioned embodiment, and various modifications can be made without departing from the essence of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device configured to track the image of a tracking point which is a tracking target within a moving image wherein contents, of a plurality of images which are continuous temporally, are discontinuous temporally, said information processing device comprising:
   block matching means configured to perform block matching regarding some images of said moving image, wherein an image to be processed and an image which is temporally prior to said image to be processed are compared to determine the position of said tracking point within said image to be processed;
   interpolation means configured to perform interpolation processing wherein the position of said tracking point within an image which is not subjected to said block matching by said block matching means, which is an image before or after said image to be processed within said moving image, having content at the same point-in-time as that of said image to be processed, is determined as the position of said tracking point within said image to be processed; and
   motion vector calculating means configured to obtain the motion vector of said tracking point from an image which is temporally prior to said image to be processed to said image to be processed based on the position of said tracking point within said image to be processed determined by said block matching means and said interpolation means,
   wherein the image to be processed by said block matching means corresponds to a first subset of fields of an image frame of the plurality of images, and wherein the image which is not subjected to said block matching corresponds to a second subset of fields of the image frame of the plurality of images.

2. The information processing device according to claim 1, wherein said moving image is a moving image subjected to 2-3 pulldown conversion for dividing a frame image into two or three field images.

3. The information processing device according to claim 1, wherein said moving image is a moving image subjected to 2-2 pulldown conversion for dividing a frame image into two field images.

4. The information processing device according to claim 1, wherein said motion vector calculating means include:
   first motion vector calculating means configured to obtain the motion vector of said tracking point from an image which is temporally prior to said image to be processed to said image to be processed based on the position of said tracking point within the image to be processed determined by said interpolation means; and
   second motion vector calculating means, based on the position of said tracking point within the image to be processed determined by said block matching means, and the position of said tracking point within an image which is prior to said image to be processed determined by said interpolation means, configured to obtain the motion vector of said tracking point from said previous image to said image to be processed.

5. An information processing method for an information processing device configured to track the image of a tracking point which is a tracking target within a moving image wherein contents, of a plurality of images which are continuous temporally, are discontinuous temporally, said method comprising the steps of:
   performing block matching regarding some images of said moving image, wherein an image to be processed and an image which is temporally prior to said image to be processed are compared to determine the position of said tracking point within said image to be processed;
   performing interpolation processing wherein the position of said tracking point within an image which is not subjected to said block matching, which is an image before or after said image to be processed within said moving image, having content at the same point-in-time as that of said image to be processed, is determined as the position of said tracking point within said image to be processed; and
   obtaining the motion vector of said tracking point from an image which is temporally prior to said image to be processed to said image to be processed based on the position of said tracking point within said image to be processed determined by said block matching processing and said interpolation processing,
   wherein the image to be processed in said block matching corresponds to a first subset of fields of an image frame of the plurality of images, and wherein the image which is not subjected to said block matching corresponds to a second subset of fields of the image frame of the plurality of images.

6. A non-transitory computer-readable storage medium having computer readable program codes embodied in the computer readable storage medium that track the image of a tracking point which is a tracking target within a moving image wherein contents, of a plurality of images which are continuous temporally, are discontinuous temporally, and that, when executed, cause a computer to execute the steps of:
performing block matching regarding some images of said moving image, wherein an image to be processed and an image which is temporally prior to said image to be processed are compared to determine the position of said tracking point within said image to be processed;
performing interpolation processing wherein the position of said tracking point within an image which is not subjected to said block matching by said block matching processing, which is an image before or after said image to be processed within said moving image, having content at the same point-in-time as that of said image to be processed, is determined as the position of said tracking point within said image to be processed; and
obtaining the motion vector of said tracking point from an image which is temporally prior to said image to be processed to said image to be processed based on the position of said tracking point within said image to be processed determined by said block matching processing and said interpolation processing,
wherein the image to be processed in said block matching corresponds to a first subset of fields of an image frame of the plurality of images, and wherein the image which is not subjected to said block matching corresponds to a second subset of fields of the image frame of the plurality of images.

7. An information processing device configured to track the image of a tracking point which is a tracking target within a moving image, said information processing device comprising:
block matching means configured to perform block matching regarding some images of said moving image, wherein an image to be processed and an image which is temporally prior to said image to be processed are compared to determine the position of said tracking point within said image to be processed;
discontinuity detecting means configured to detect temporal discontinuity regarding the contents of a plurality of images which are continuous temporally in said moving image;
interpolation means configured to perform interpolation processing wherein,
in a case where temporal discontinuity has been detected by said discontinuity detecting means, the position of said tracking point within an image which is not subjected to said block matching by said block matching means, which is an image before or after an image to be processed within said moving image, having content at the same point-in-time as that of said image to be processed, is determined as the position of said tracking point within said image to be processed, and
in a case where temporal discontinuity has not been detected by said discontinuity detecting means, an intermediate point between the position of said tracking point within an image which is not subjected to said block matching by said block matching means, which is an image before an image to be processed within said moving image, the position of said tracking point within an image which is not subjected to said block matching by said block matching means, which is an image after an image to be processed within said moving image, is determined as the position of said tracking point within said image to be processed; and
motion vector calculating means configured to obtain the motion vector of said tracking point from an image which is temporally prior to said image to be processed to said image to be processed based on the position of said tracking point within said image to be processed determined by said block matching means and said interpolation means,
wherein the image to be processed in said block matching means corresponds to a first subset of fields of an image frame of the plurality of images, and wherein the image which is not subjected to said block matching corresponds to a second subset of fields of the image frame of the plurality of images.

8. The information processing device according to claim 7, wherein the moving image of which the temporal discontinuity has been detected by said discontinuity detecting means is a moving image subjected to 2-3 pulldown conversion for dividing a frame image into two or three field images.

9. The information processing device according to claim 7, wherein the moving image of which the temporal discontinuity has been detected by said discontinuity detecting means is a moving image subjected to 2-2 pulldown conversion for dividing a frame image into two field images.

10. The information processing device according to claim 7, wherein said motion vector calculating means include:
first motion vector calculating means configured to obtain the motion vector of said tracking point from an image which is temporally prior to said image to be processed to said image to be processed based on the position of said tracking point within the image to be processed determined by said interpolation means; and
second motion vector calculating means, based on the position of said tracking point within the image to be processed determined by said block matching means, and the position of said tracking point within an image which is prior to said image to be processed determined by said interpolation means, configured to obtain the motion vector of said tracking point from said previous image to said image to be processed.

11. An information processing method for an information processing device configured to track the image of a tracking point which is a tracking target within a moving image, said method comprising the steps of:
performing block matching regarding some images of said moving image, wherein an image to be processed and an image which is temporally prior to said image to be processed are compared to determine the position of said tracking point within said image to be processed;
detecting temporal discontinuity regarding the contents of a plurality of images which are continuous temporally in said moving image;
performing interpolation processing wherein,
in a case where temporal discontinuity has been detected, the position of said tracking point within an image which is not subjected to said block matching, which is an image before or after said image to be processed within said moving image, having content at the same point-in-time as that of said image to be processed, is determined as the position of said tracking point within said image to be processed, and in a case where temporal discontinuity has not been detected, an intermediate point between the position of said tracking point within an image which is not subjected to said block matching, which is an image before an image to be processed within said moving image, the position of said tracking point within an image which is not subjected to said block matching, which is an image after an image to be processed within said moving image, is determined as the position of said tracking point within said image to be processed; and obtaining the motion vector of said tracking point from an image which is temporally prior to said image to be processed to said image to be processed based on the position of said tracking point within said image to be processed determined by said block matching processing and said interpolation processing, wherein the image to be processed in said block matching corresponds to a first subset of fields of an image frame of the plurality of images, and wherein the image which is not subjected to said block matching corresponds to a second subset of fields of the image frame of the plurality of images.

12. A non-transitory computer-readable storage medium having computer readable program codes embodied in the computer readable storage medium that track the image of a tracking point which is a tracking target within a moving image, and that, when executed, cause a computer to execute the steps of:

performing block matching regarding some images of said moving image, wherein an image to be processed and an image which is temporally prior to said image to be processed are compared to determine the position of said tracking point within said image to be processed;

detecting temporal discontinuity regarding the contents of a plurality of images which are continuous temporally in said moving image;

performing interpolation processing wherein, in a case where temporal discontinuity has been detected by said detecting temporal discontinuity processing, the position of said tracking point within an image which is not subjected to said block matching by said block matching processing, which is an image before or after said image to be processed within said moving image, having content at the same point-in-time as that of said image to be processed, is determined as the position of said tracking point within said image to be processed, and in a case where temporal discontinuity has not been detected by said detecting temporal discontinuity processing, an intermediate point between the position of said tracking point within an image which is not subjected to said block matching by said block matching processing, which is an image before an image to be processed within said moving image, the position of said tracking point within an image which is not subjected to said block matching, which is an image after an image to be processed within said moving image, is determined as the position of said tracking point within said image to be processed; and obtaining the motion vector of said tracking point from an image which is temporally prior to said image to be processed to said image to be processed based on the position of said tracking point within said image to be processed determined by said block matching processing and said interpolation processing, wherein the image to be processed in said block matching corresponds to a first subset of fields of an image frame of the plurality of images, and wherein the image which is not subjected to said block matching corresponds to a second subset of fields of the image frame of the plurality of images.

13. An information processing device configured to track the image of a tracking point which is a tracking target within a moving image wherein contents, of a plurality of images which are continuous temporally, are discontinuous temporally, said information processing device comprising:

a block matching unit configured to perform block matching regarding some images of said moving image, wherein an image to be processed and an image which is temporally prior to said image to be processed are compared to determine the position of said tracking point within said image to be processed;

an interpolation unit configured to perform interpolation processing wherein the position of said tracking point within an image which is not subjected to said block matching by said block matching unit, which is an image before or after said image to be processed within said moving image, having content at the same point-in-time as that of said image to be processed, is determined as the position of said tracking point within said image to be processed; and a motion vector calculating unit configured to obtain the motion vector of said tracking point from an image which is temporally prior to said image to be processed to said image to be processed based on the position of said tracking point within said image to be processed determined by said block matching unit and said interpolation unit, wherein the image to be processed by said block matching unit corresponds to a first subset of fields of an image frame of the plurality of images, and wherein the image which is not subjected to said block matching corresponds to a second subset of fields of the image frame of the plurality of images.

14. An information processing device configured to track the image of a tracking point which is a tracking target within a moving image, said information processing device comprising:

a block matching unit configured to perform block matching regarding some images of said moving image, wherein an image to be processed and an image which is temporally prior to said image to be processed are compared to determine the position of said tracking point within said image to be processed;

a discontinuity detecting unit configured to detect temporal discontinuity regarding the contents of a plurality of images which are continuous temporally in said moving image;

an interpolation unit configured to perform interpolation processing wherein, in a case where temporal discontinuity has been detected by said discontinuity detecting unit, the position of said tracking point within an image which is not subjected to said block matching by said block matching unit, which is an image before or after an image to be processed within said moving image, having content at the same point-in-time as that of said image to be processed, is determined as the position of said tracking point within said image to be processed, and in a case where temporal discontinuity has not been detected by said discontinuity detecting unit, an intermediate point between the position of said tracking point within an image which is not subjected to said block matching by said block matching unit, which is an image before an image to be processed within said moving image, the position of said tracking point within an image which is not subjected to said block matching by said block matching unit, which is an image after an image to be processed within said moving image, is determined as the position of said tracking point within said image to be processed; and a motion vector calculating unit configured to obtain the motion vector of said tracking point from an image which is temporally prior to said image to be processed to said image to be processed based on the position of said tracking point within said image to be processed determined by said block matching unit and said interpolation unit, wherein the image to be processed by said block matching unit corresponds to a first subset of fields of an image frame of the plurality of images, and wherein the image which is not subjected to said block matching corresponds to a second subset of fields of the image frame of the plurality of images.

* * * * *